(12) United States Patent
Miyabayashi

(10) Patent No.: US 7,906,567 B2
(45) Date of Patent: *Mar. 15, 2011

(54) PROCESS FOR PRODUCING ENCAPSULATED PRODUCT, AND ENCAPSULATED PRODUCT

(75) Inventor: Toshiyuki Miyabayashi, Shiojin (JP)

(73) Assignee: Seiko Epson Corporation, Tokyo (JP)

( * ) Notice: Subject to any disclaimer, the term of this patent is extended or adjusted under 35 U.S.C. 154(b) by 603 days.

This patent is subject to a terminal disclaimer.

(21) Appl. No.: 11/789,320

(22) Filed: Apr. 24, 2007

(65) Prior Publication Data

US 2008/0039550 A1    Feb. 14, 2008

(30) Foreign Application Priority Data

Apr. 25, 2006 (JP) ................ P.2006-120279

(51) Int. Cl.
*C08K 9/00* (2006.01)
*B01J 13/02* (2006.01)

(52) U.S. Cl. ............ 523/200; 427/213.36; 106/409; 106/413; 106/472; 106/474

(58) Field of Classification Search ........ 524/496, 524/556, 700; 427/213.36; 523/200; 522/71
See application file for complete search history.

(56) References Cited

U.S. PATENT DOCUMENTS

| | | | |
|---|---|---|---|
| 6,538,047 B1 * | 3/2003 | Miyabayashi | 523/160 |
| 2003/0029355 A1 * | 2/2003 | Miyabayashi | 106/31.27 |
| 2005/0176877 A1 | 8/2005 | Miyabayashi | |
| 2006/0222851 A1 * | 10/2006 | Miyabayashi et al. | 428/408 |
| 2007/0157848 A1 | 7/2007 | Miyabayashi | |

FOREIGN PATENT DOCUMENTS

| | | |
|---|---|---|
| JP | 05-320276 | 12/1993 |
| JP | 05-339516 | 12/1993 |
| JP | 7-94634 | 10/1995 |

(Continued)

OTHER PUBLICATIONS

JPO computer English translation of JP 7-94634 dated Oct. 11, 1995.

(Continued)

*Primary Examiner* — Mark Eashoo
*Assistant Examiner* — Jessica Paul
(74) *Attorney, Agent, or Firm* — Ladas & Parry

(57) ABSTRACT

The present invention provides a method for producing an encapsulated product in which a core substance having an electric charge on its surface is coated with a wall material comprising a polymer as a main component, the production method comprising at least the following steps (1) to (4): (1) a step of adding an ionic polymerizable surfactant A containing an ionic group having the opposite electric charge to the electric charge on the surface of the core substance, a hydrophobic group and a polymerizable group to an aqueous solvent containing the core substance, followed by mixing, thereby adsorbing the ionic polymerizable surfactant A to the surface of the core substance; (2) a step of adding, after said step (1), an ionic polymerizable surfactant B containing an ionic group having the same or opposite electric charge to the electric charge on the surface of the core substance, a hydrophobic group and a polymerizable group, followed by mixing; (3) a step of adding, after said step (2), a hydrophobic monomer and an oil-soluble polymerization initiator, followed by mixing; and (4) a step of polymerizing the ionic polymerizable surfactant A, the ionic polymerizable surfactant B and the hydrophobic monomer to form the polymer. Also, an encapsulated product obtained by this production method is disclosed.

12 Claims, 6 Drawing Sheets

FOREIGN PATENT DOCUMENTS

| | | |
|---|---|---|
| JP | 8-59715 | 3/1996 |
| JP | 08-081647 | 3/1996 |
| JP | 08-183920 | 7/1996 |
| JP | 08-218015 | 8/1996 |
| JP | 08-295837 | 11/1996 |
| JP | 08-302227 | 11/1996 |
| JP | 08-302228 | 11/1996 |
| JP | 09-003376 | 1/1997 |
| JP | 09-031360 | 2/1997 |
| JP | 09-104834 | 4/1997 |
| JP | 09-151342 | 6/1997 |
| JP | 09-217019 | 8/1997 |
| JP | 09-286939 | 11/1997 |
| JP | 09-316353 | 12/1997 |
| JP | 10-046075 | 2/1998 |
| JP | 10-140065 | 5/1998 |
| JP | 10-292143 | 11/1998 |
| JP | 11-080633 | 3/1999 |
| JP | 11-152424 | 6/1999 |
| JP | 11-166145 | 6/1999 |
| JP | 11-199783 | 7/1999 |
| JP | 11-209672 | 8/1999 |
| JP | 11-349870 | 12/1999 |
| JP | 2000-007961 | 1/2000 |
| JP | 2000-044852 | 2/2000 |
| JP | 2000-053897 | 2/2000 |
| JP | 2000-053898 | 2/2000 |
| JP | 2000-053899 | 2/2000 |
| JP | 2000-053900 | 2/2000 |
| JP | 2000-113327 | 4/2000 |
| JP | 2003-030661 | 1/2003 |
| JP | 2003-306611 | 10/2003 |
| JP | 2004-359960 | 12/2004 |
| JP | 2005-097476 | 4/2005 |
| JP | 2005-097517 | 4/2005 |
| JP | 2005-097518 | 4/2005 |
| JP | 2005-133012 | 5/2005 |
| JP | 2006-057087 | 3/2006 |
| JP | 2006-122900 | 5/2006 |
| WO | 01/94482 | 12/2001 |
| WO | 01/96483 | 12/2001 |

OTHER PUBLICATIONS

Patent Abstracts of Japan computer English translation and abstract of JP 8-59715 dated Mar. 5, 1996.
Patent Abstracts of Japan computer English translation and abstract of JP 2003-030661 dated Jan. 31, 2003.
Patent Abstracts of Japan computer English translation and abstract of JP 05-339516 dated Dec. 21, 1993.
Patent Abstracts of Japan computer English translation and abstract of JP 08-302227 dated Nov. 19, 1996.
Patent Abstracts of Japan computer English translation and abstract of JP 08-302228 dated Nov. 19, 1996.
Patent Abstracts of Japan computer English translation and abstract of JP 08-081647 dated Mar. 26, 1996.
Patent Abstracts of Japan computer English translation and abstract of JP 05-320276 dated Dec. 3, 1993.
Patent Abstracts of Japan computer English translation and abstract of JP 08-218015 dated Aug. 27, 1996.
Patent Abstracts of Japan computer English translation and abstract of 08-295837 dated Nov. 12, 1996.
Patent Abstracts of Japan computer English translation and abstract of JP 09-003376 dated Jan. 7, 1997.
Patent Abstracts of Japan computer English translation and abstract of JP 08-183920 dated Jul. 16, 1996.
Patent Abstracts of Japan computer English translation and abstract of JP 10-046075 dated Feb. 17, 1998.
Patent Abstracts of Japan computer English translation and abstract of JP 10-292143 dated Nov. 4, 1998.
Patent Abstracts of Japan computer English translation and abstract of JP 11-080633 dated Mar. 26, 1999.
Patent Abstracts of Japan computer English translation and abstract of JP 11-349870 dated Dec. 21, 1999.
Patent Abstracts of Japan computer English translation and abstract of JP 2000-007961 dated Jan. 11, 2000.
Patent Abstracts of Japan computer English translation and abstract of JP 09-031360 dated Feb. 4, 1997.
Patent Abstracts of Japan computer English translation and abstract of JP 09-217019 dated Aug. 19, 1997.
Patent Abstracts of Japan computer English translation and abstract of JP 09-316353 dated Dec. 9, 1997.
Patent Abstracts of Japan computer English translation and abstract of JP 09-104834 dated Apr. 22, 1997.
Patent Abstracts of Japan computer English translation and abstract of JP 09-151342 dated Jun. 10, 1997.
Patent Abstracts of Japan computer English translation and abstract of JP 10-140065 dated May 26, 1998.
Patent Abstracts of Japan computer English translation and abstract of JP 11-152424 dated Jun. 8, 1999.
Patent Abstracts of Japan computer English translation and abstract of JP 11-166145 dated Jun. 22, 1999.
Patent Abstracts of Japan computer English translation and abstract of JP 11-199783 dated Jul. 27, 1999.
Patent Abstracts of Japan computer English translation and abstract of JP 11-209672 dated Aug. 3, 1999.
Patent Abstracts of Japan computer English translation and abstract of JP 09-286939 dated Nov. 4, 1997.
Patent Abstracts of Japan computer English translation and abstract of JP 2000-044852 dated Feb. 15, 2000.
Patent Abstracts of Japan computer English translation and abstract of JP 2000-053897 dated Feb. 22, 2000.
Patent Abstracts of Japan computer English translation and abstract of JP 2000-053898 dated Feb. 22, 2000.
Patent Abstracts of Japan computer English translation and abstract of JP 2000-053899 dated Feb. 22, 2000.
Patent Abstracts of Japan computer English translation and abstract of JP 2000-053900 dated Feb. 22, 2000.
Patent Abstracts of Japan computer English translation and abstract of JP 2000-113327 dated Apr. 21, 2000.
Patent Abstracts of Japan computer English translation and abstract of JP 2003-306611 dated Oct. 31, 2003.
Patent Abstracts of Japan computer English translation and abstract of JP 2004-359960 dated Dec. 24, 2004.
Patent Abstracts of Japan computer English translation and abstract of JP 2005-097476 dated Apr. 14, 2005.
Patent Abstracts of Japan computer English translation and abstract of JP 2005-097517 dated Apr. 14, 2005.
Patent Abstracts of Japan computer English translation and abstract of JP 2005-097518 dated Apr. 14, 2005.
Patent Abstracts of Japan computer English translation and abstract of 2006-122900 dated May 18, 2006.
English abstract of JP 2006-057087 dated Mar. 2, 2006.

* cited by examiner

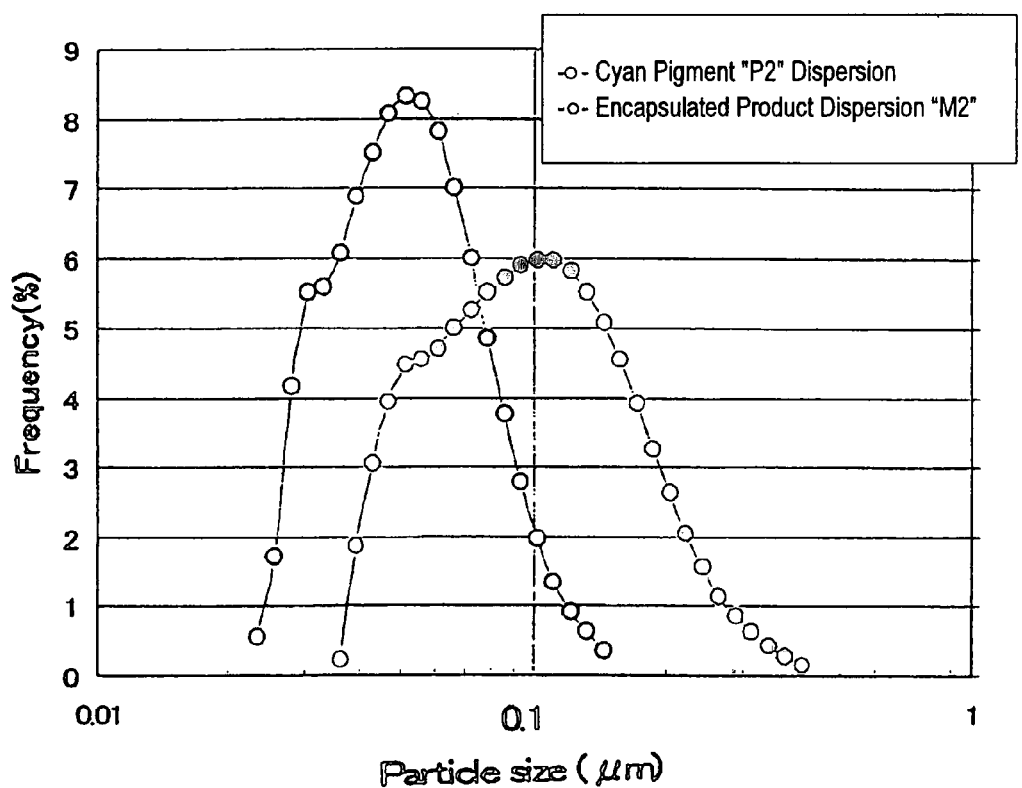

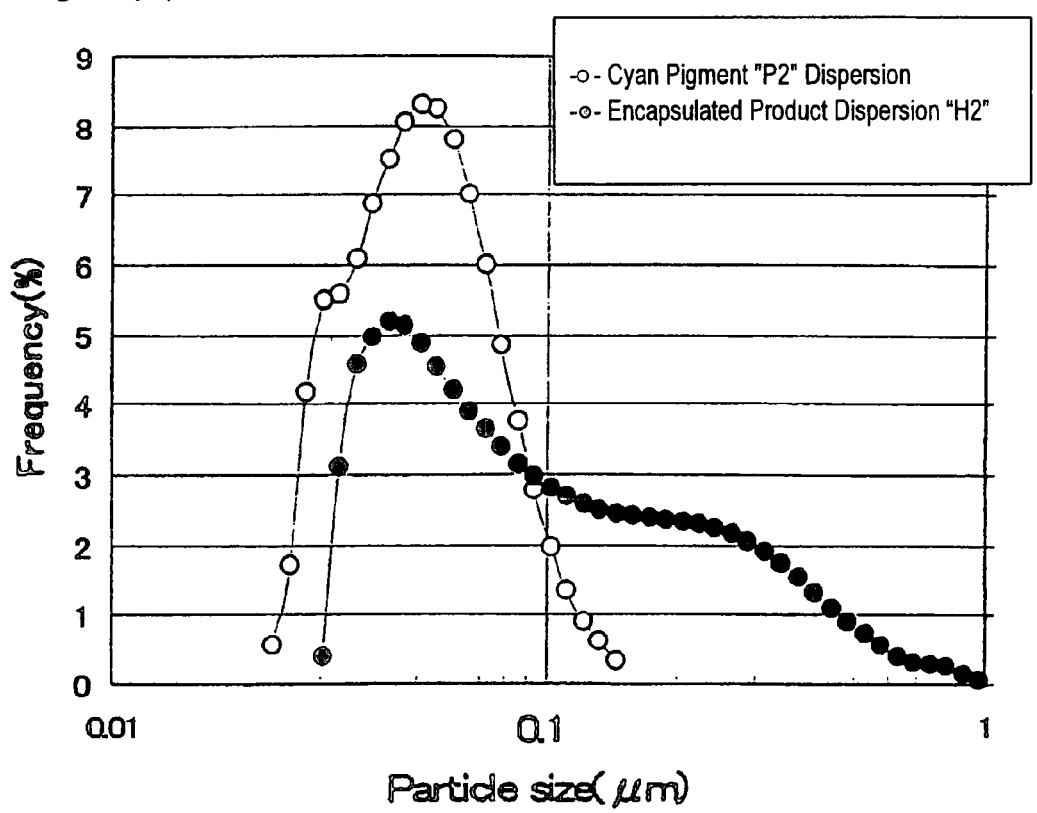

PROCESS FOR PRODUCING ENCAPSULATED PRODUCT, AND ENCAPSULATED PRODUCT

FIELD OF THE INVENTION

The present invention relates to a production method of an encapsulated product useful as an additive or the like of, for example, inks or coating materials, and an encapsulated product obtained by the production method.

BACKGROUND OF THE INVENTION

Conventionally, encapsulation of various substances has been performed in many industrial and technical fields. In the industry of printing, coating material and ink, a large number of encapsulation techniques using a pigment, a coloring matter or the like as the core substance have been practiced. Also, in the medical or agricultural field, many efforts to encapsulate a drug as the core substance have been made for the purpose of increasing efficacy, decreasing toxicity, imparting stability, sustaining the effect, or the like. As for the encapsulation method, a phase separation method (coacervation method), an in-liquid drying method (interfacial precipitation method), a spray drying method, a pan coating method, an in-liquid curing and coating method, an interfacial polymerization method, an interfacial inorganic reaction method, an in-situ polymerization method and the like are known. However, these methods have a problem that, for example, the core substance is limited, the thickness of the shell layer (wall material, that is, coat layer of the core substance) coating the core substance is hard to freely design, encapsulation of one piece of the core substance is difficult, the functional group on the capsule surface is hard to freely design, a particle having a uniform surface state cannot be easily produced, encapsulation on the nano-order is not easy, application to a relatively unstable compound is difficult, a solvent used at the production of a preparation is readily mixed into the product, or the property of the obtained capsule is not satisfied. Also, the resulting encapsulated product itself has a problem depending on the usage.

In an inkjet recording method of jetting out an ink droplet from a fine nozzle head and recording a character or a figure on the surface of a recording medium such as paper, an aqueous pigment ink obtained by dispersing a pigment in water has recently come to be used because of its excellent water resistance or light fastness. As for such an aqueous pigment ink, those obtained by dispersing a pigment in an aqueous dispersion medium with use of a dispersant such as surfactant or polymer dispersant are generally used in many cases. However, when a dispersant is used for the dispersion of pigment particles, the ink composition has many points to be adjusted for ensuring preferred properties as an ink, for example, there is a problem that when high print density, fixing property or scratch resistance is intended to obtain, the viscosity tends to be high.

Furthermore, in such an aqueous pigment ink, the dispersant is merely adsorbing to the pigment particle surface and in the inkjet recording method where a strong shear force is applied to the pigment particle, the dispersant adsorbing to the pigment particle surface is sometimes desorbed, as a result, the dispersibility of the pigment ink may be decreased to deteriorate the ejection stability (property that the ink is stably jetted out to a constant direction from a recording head). Also, in a pigment ink using a pigment dispersed by using a dispersant such as surfactant or polymer dispersant, desorption and absorption of the dispersant readily occurs and when the ink is stored for a long time, the dispersion is liable to become unstable.

On the other hand, for the purpose of enhancing the fixing property of the dispersed particle (for example, pigment particle) contained in a particle dispersion-type inkjet ink (for example, pigment-type inkjet ink) on a recording medium, a technique of using an encapsulated product obtained by coating a dispersed particle (for example, pigment particle) with a polymer is known.

Those prepared by encapsulating a pigment particle (see, for example, Patent Documents 1, 2 and 3) or those prepared by graft-polymerizing a polymer to the surface of a pigment particle (see, for example, Patent Documents 4 to 7) have been proposed. Also, a method of encapsulating a hydrophobic powder by using an amphipatic graft polymer has been proposed (see, for example, Patent Document 8). In these methods, a previously polymerized polymer is used for the encapsulation, and this incurs a problem that a large particle diameter tends to result after encapsulation and the particle diameter cannot be easily controlled.

Other than these proposals, there has been proposed an ink using a pigment on which a resin capable of forming a film at room temperature is coated by a phase inversion emulsification method (see, for example, Patent Documents 9 to 17), or an ink using a pigment on which an anionic group-containing organic polymer compound is coated by an acid precipitation method (see, for example, Patent Documents 18 to 27).

In addition, an ink containing a dispersed particle prepared by encapsulating a color material in a polymer by a phase inversion emulsification method has been proposed (see, for example, Patent Documents 28 to 33). However, when a color material obtained by a phase inversion emulsification method or an acid precipitation method is used for an ink, the polymer adsorbed to the color material may desorb and dissolve in the ink depending on the organic solvent contained in the ink, such as penetrant, and the dispersion stability or ejection stability of ink, the image quality and the like may not be obtained in a satisfactory level.

| | |
|---|---|
| Patent Document 1: | JP-B-7-94634 |
| Patent Document 2: | JP-A-8-59715 |
| Patent Document 3: | JP-A-2003-306661 |
| Patent Document 4: | JP-A-5-339516 |
| Patent Document 5: | JP-A-8-302227 |
| Patent Document 6: | JP-A-8-302228 |
| Patent Document 7: | JP-A-8-81647 |
| Patent Document 8: | JP-A-5-320276 |
| Patent Document 9: | JP-A-8-218015 |
| Patent Document 10: | JP-A-8-295837 |
| Patent Document 11: | JP-A-9-3376 |
| Patent Document 12: | JP-A-8-183920 |
| Patent Document 13: | JP-A-10-46075 |
| Patent Document 14: | JP-A-10-292143 |
| Patent Document 15: | JP-A-11-80633 |
| Patent Document 16: | JP-A-11-349870 |
| Patent Document 17: | JP-A-2000-7961 |
| Patent Document 18: | JP-A-9-31360 |
| Patent Document 19: | JP-A-9-217019 |
| Patent Document 20: | JP-A-9-316353 |
| Patent Document 21: | JP-A-9-104834 |
| Patent Document 22: | JP-A-9-151342 |
| Patent Document 23: | JP-A-10-140065 |
| Patent Document 24: | JP-A-11-152424 |
| Patent Document 25: | JP-A-11-166145 |
| Patent Document 26: | JP-A-11-199783 |
| Patent Document 27: | JP-A-11-209672 |
| Patent Document 28: | JP-A-9-286939 |
| Patent Document 29: | JP-A-2000-44852 |
| Patent Document 30: | JP-A-2000-53897 |

-continued

| Patent Document 31: | JP-A-2000-53898 |
| Patent Document 32: | JP-A-2000-53899 |
| Patent Document 33: | JP-A-2000-53900 |

SUMMARY OF THE INVENTION

The present invention has been made by taking into account those problems and an object of the present invention is to provide a production method of an encapsulated product having a uniform shape and a narrow particle size distribution and being capable of highly exerting various functions in various industrial and technical fields.

Other objects and effects of the invention will become apparent from the following description.

As a result of intensive studies, the present inventors have found that when polymerization is performed in water by using a specific ionic polymerizable surfactant and a hydrophobic monomer and at the same time, using an oil-soluble polymerization initiator as the polymerization initiator, an encapsulated product having a uniform shape and a narrow particle size distribution (a small CV value) can be obtained. The present invention has been accomplished based on this finding, and the technical constructions of the present invention are as follows.

[1] A method for producing an encapsulated product in which a core substance having an electric charge on its surface is coated with a wall material comprising a polymer as a main component, the production method comprising at least the following steps (1) to (4):

(1) a step of adding an ionic polymerizable surfactant A containing an ionic group having the opposite electric charge to the electric charge on the surface of the core substance, a hydrophobic group and a polymerizable group to an aqueous solvent containing the core substance, followed by mixing, thereby adsorbing the ionic polymerizable surfactant A to the surface of the core substance;

(2) a step of adding, after said step (1), an ionic polymerizable surfactant B containing an ionic group having the same or opposite electric charge to the electric charge on the surface of the core substance, a hydrophobic group and a polymerizable group, followed by mixing;

(3) a step of adding, after said step (2), and mixing a hydrophobic monomer and an oil-soluble polymerization initiator, followed by mixing; and (4) a step of polymerizing the ionic polymerizable surfactant A, the ionic polymerizable surfactant B and the hydrophobic monomer to form the polymer.

[2] The production method of an encapsulated product as described in [1] above, wherein the oil-soluble polymerization initiator is one or more members selected from the group consisting of azo polymerization initiators and organic peroxide polymerization initiators.

[3] The production method of an encapsulated product as described in [1] or [2] above, wherein in the step (1), after adding the components to the aqueous solvent and mixing, an ultrasonic wave is irradiated on the aqueous solvent.

[4] The production method of an encapsulated product as described in any one of [1] to [3] above, wherein in the step (2), a nonionic polymerizable surfactant C containing a nonionic group, a hydrophobic group and a polymerizable group is added and mixed together with the ionic polymerizable surfactant B.

[5] An encapsulated product obtained by the production method described in any one of [1] to [4] above.

[6] The encapsulated product as described in [5] above, wherein the core substance is a color material particle.

[7] The encapsulated product as described in [5] above, wherein the core substance is a pigment.

According to the production method of an encapsulated product of the present invention, an encapsulated product having a uniform shape and a narrow particle size distribution and being capable of exerting various functions in various industrial and technical fields can be provided.

More specifically, according to the present invention, an encapsulated product satisfying all of the following (A) to (I) can be provided.

(A) The core substance is not limited. That is, in the present invention, an inorganic particle, an organic particle, a polymer particle and the like can be used as the core substance, and the core substance may be either an inorganic material or an organic material.

(B) The thickness of the wall material (coat layer of the core substance) can be freely designed.

(C) One piece of the core substance can be encapsulated.

(D) The functions of the core substance and the wall material can be separated therebetween. Accordingly, the design latitude of the encapsulated product is wide and a high-performance encapsulated product suitable for usage can be obtained.

(E) A particle having a uniform surface state can be produced.

(F) Encapsulation on the nano-order is easy.

(G) A particle having a uniform particle diameter can be produced.

(H) Environment-friendly. That is, the production method of the present invention does not use an organic solvent harmful to a living organism, can be practiced by a reaction in an aqueous system and therefore, causes no adverse effect on the environment.

(I) A core substance having toxicity or the like can be rendered low-toxic or harmless by encapsulation.

Also, the encapsulated product obtained by the production method of an encapsulated product of the present invention is useful particularly as a color material for inks and provides the following effects of (i) to (v).

(i) When used as a color material for inks, excellent dispersion stability in an aqueous dispersion is achieved.

(ii) When formed into an ink, a recorded material with an image having excellent fastness can be obtained.

(iii) When formed into an ink, a recorded material with an image having excellent scratch resistance can be obtained.

(iv) When formed into an ink for inkjet recording, excellent ejection stability from a recording head is achieved.

(v) When formed into an ink for inkjet recording, excellent image quality is achieved.

Furthermore, the encapsulated product obtained by the production method of an encapsulated product of the present invention is useful as an electrophotographic toner and enables obtaining a high-sharpness image by virtue of its truly spherical shape and obtaining a high-releasability toner by virtue of containing a release agent such as silicone oil in the polymer layer covering the core substance pigment.

According to the production method of an encapsulated product of the present invention, the polymer of the coat layer for the core substance can be freely designed in accordance with the desired function and at the same time, an encapsulated product having an intended property can be easily obtained by selecting the functional group in the outermost shell.

BRIEF DESCRIPTION OF THE DRAWINGS

FIG. 6(*a*) is a comparison view between the particle size distribution (measured) of a Cyan Pigment P2 dispersion and an estimated particle size distribution (calculated) of Encapsulated Product Dispersion M2 obtained using the cyan pigment dispersion; FIG. 6(*b*) is a comparison view between the particle size distribution (measured) of a Cyan Pigment P2 dispersion and a particle size distribution (measured) of Encapsulated Product Dispersion M2 of Example 2 obtained using the cyan pigment dispersion; and FIG. 6(*c*) is a comparison view between the particle size distribution (measured) of a Cyan Pigment P2 dispersion and a particle size distribution (measured) of Encapsulated Product Dispersion H2 of Comparative Example 2 obtained using the cyan pigment dispersion.

Figure 1:
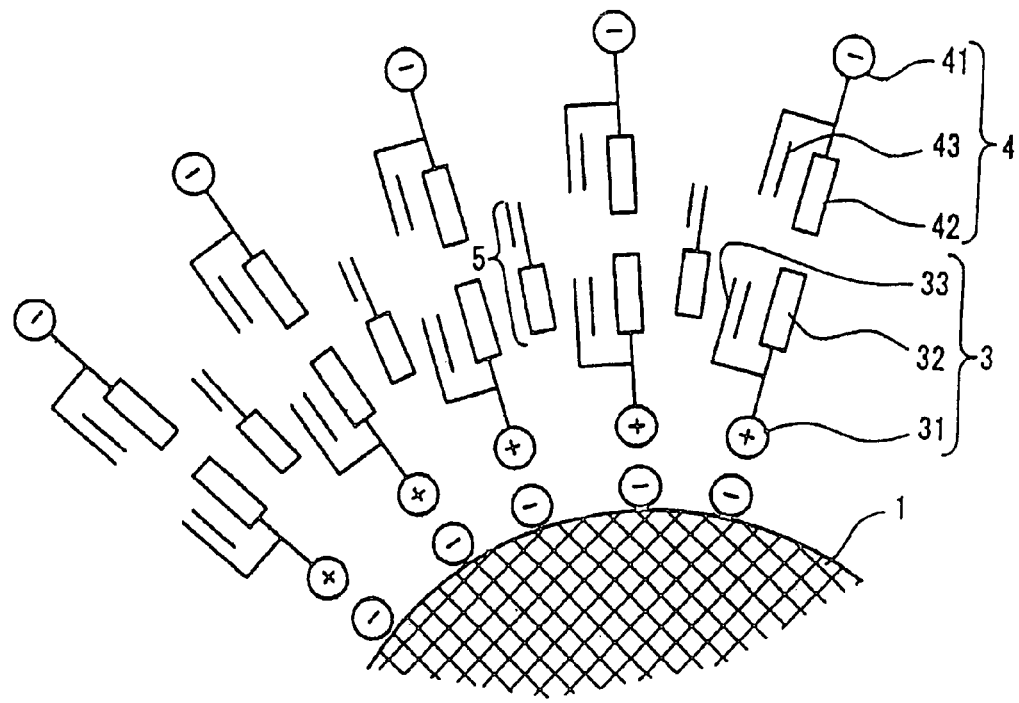
FIG. 1 is a schematic view showing the state where a core substance having an electric charge on the surface (the core substance itself has a negative charge on the surface) is dispersed in an aqueous solvent and is also present together with an ionic polymerizable surfactant A (3), an ionic polymerizable surfactant B (4) and a hydrophobic monomer (5).

The reference numerals used in the drawings denote the followings, respectively.

1: Core substance
2: Anionic surfactant
3: Ionic (cationic) polymerizable surfactant A
4: Ionic (anionic) polymerizable surfactant B
5: Hydrophobic monomer
8: Nonionic polymerizable surfactant C
21 and 41: Anionic group
22, 32, 42 and 82: Hydrophobic group
31: Cationic group
33, 43 and 83: Polymerizable group
60: Wall material
81: Nonionic group
100: Encapsulated product

DETAILED DESCRIPTION OF THE INVENTION

The production method of an encapsulated product of the present invention (hereinafter sometimes simply referred to as "the production method") is described in detail below.

The production method of the present invention is a production method of an encapsulated product in which a core substance having an electric charge on its surface is coated with a wall material comprising a polymer as a main component, the production method comprising at least the following steps (1) to (4):

(1) a step of adding "an ionic polymerizable surfactant A containing an ionic group having the opposite electric charge to the electric charge on the surface of the core substance, a hydrophobic group and a polymerizable group" to an aqueous solvent containing the core substance, followed by mixing, thereby adsorbing the ionic polymerizable surfactant A to the surface of the core substance;

(2) a step of adding, after said step (1), "an ionic polymerizable surfactant B containing an ionic group having the same or opposite electric charge to the electric charge on the surface of the core substance, a hydrophobic group and a polymerizable group", followed by mixing;

(3) a step of adding, after said step (2), a hydrophobic monomer and an oil-soluble polymerization initiator, followed by mixing; and (4) a step of polymerizing the ionic polymerizable surfactant A, the ionic polymerizable surfactant B and the hydrophobic monomer to form the polymer.

As one characteristic feature of the present invention, the ionic polymerizable surfactant A, the ionic polymerizable surfactant B and the hydrophobic monomer are sequentially added to a core substance-containing aqueous solvent, each followed by mixing, through the steps (1) to (3), thereby forming an admicell which is a configuration mode where these components are controlled on the core substance in a very high level.

FIG. 1 is a schematic view showing one example of the admicell present in the solvent passed through the steps (1) to (3).

The core substance 1 has a negative charge on the surface and is dispersed in a solvent comprising water as the main component (aqueous solvent). The cationic polymerizable surfactant 3 (ionic polymerizable surfactant A) is disposed by allowing its cationic group 31 to face the core substance 1 and adsorbs to the core substance 1 by a strong ionic bond. The hydrophobic group 42 and polymerizable group 43 of the anionic polymerizable surfactant 4 (ionic polymerizable surfactant B) are facing the hydrophobic group 32 and polymerizable group 33 of the cationic polymerizable surfactant 3 by a hydrophobic interaction, and the anionic group 41 of the anionic polymerizable surfactant 4 is present in the direction where the aqueous solvent is present, that is, in the direction remotest from the core substance 1. The hydrophobic monomer 5 is present in a hydrophobic phase formed resulting from the hydrophobic group 32 and polymerizable group 33 of the cationic polymerizable surfactant 3 facing the hydrophobic group 42 and polymerizable group 43 of the anionic polymerizable surfactant 4.

Figure 2:
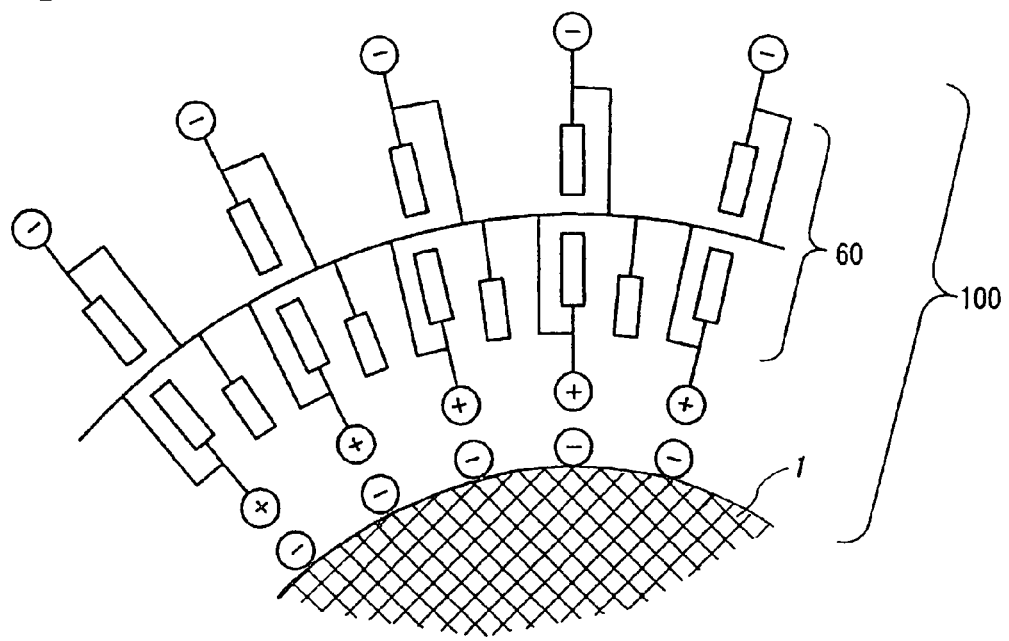
FIG. 2 is a schematic view showing the state where, in the dispersion state shown in FIG. 1, an ionic polymerizable surfactant A (3), an ionic polymerizable surfactant B (4) and a hydrophobic monomer (5) are polymerized.

In the solvent where the admicell shown in FIG. 1 is present (the solvent passed through the steps (1) to (3)), according to the step (4), the oil-soluble polymerization initiator is activated and in turn, the cationic polymerizable surfactant 3, anionic polymerizable surfactant 4 and hydrophobic monomer 5 are polymerized to form a polymer, whereby the encapsulated product 100 of the present invention is produced, in which as shown in FIG. 2, the core substance 1 is coated with a wall material 60 comprising the polymer as the main component. Here, the anionic group 41 on the surface of the wall material 60 is regularly and densely present toward the aqueous phase side and this enables good dispersion of the encapsulated product 100 in an aqueous medium.

Figure 3:
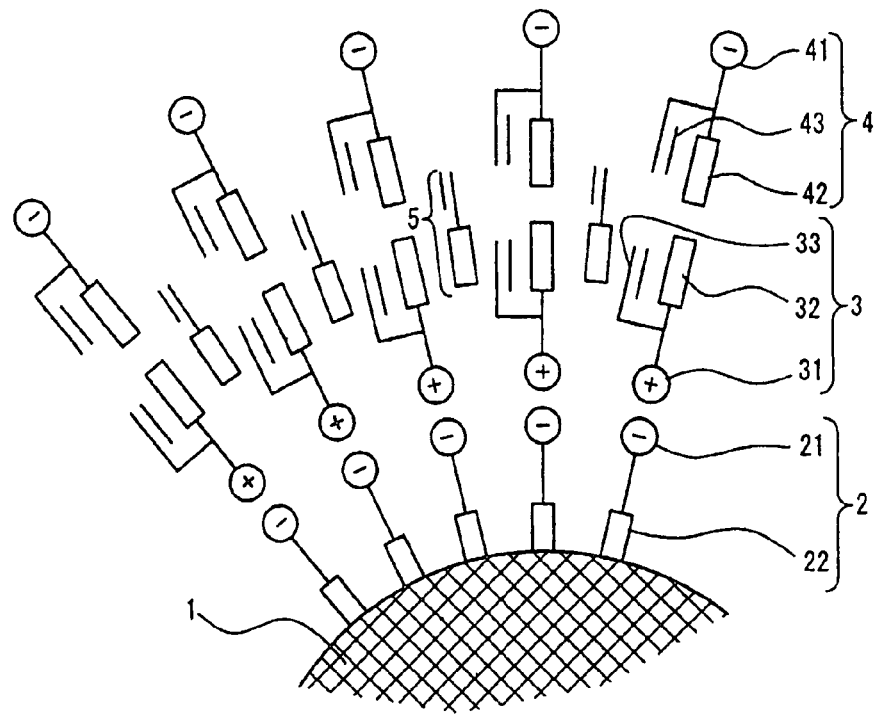
FIG. 3 is a schematic view showing the state where a core substance (a core substance having an electric charge on the surface) having adsorbed to the surface thereof an anionic surfactant (2) is dispersed in an aqueous solvent and is also present together with an ionic polymerizable surfactant A (3), an ionic polymerizable surfactant B (4) and a hydrophobic monomer (5).
Figure 4:
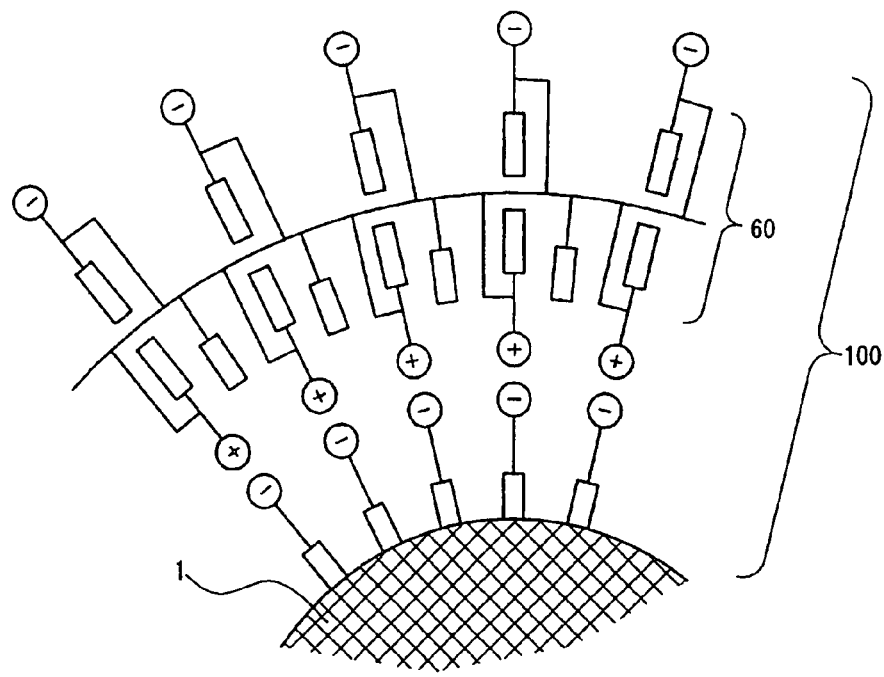
FIG. 4 is a schematic view, showing the state where, in the dispersion state shown in FIG. 3, an ionic polymerizable surfactant A (3), an ionic polymerizable surfactant B (4) and a hydrophobic monomer (5) are polymerized.

FIG. 3 is a schematic view showing another example of the admicell present in the solvent passed through the steps (1) to (3). FIG. 4 is a schematic view showing the state where in the dispersion state shown in FIG. 3, various monomers are polymerized. The modes shown in FIGS. 3 and 4 are the same as the modes shown in FIGS. 1 and 2 except that an ionic (anionic) surfactant 2 having an ionic (anionic) group 21 and a hydrophobic group 22 is adsorbed to the surface of the core substance 1, and the descriptions in FIGS. 1 and 2 are applied to the same numerals as the numerals in FIGS. 1 and 2.

In this way, in the production method of the present invention, an admicell in the state that respective polymerization components (ionic polymerizable surfactant A, ionic polymerizable surfactant B, hydrophobic monomer) are controlled in the periphery of the core substance in a very high level and the ionic group is oriented in the outermost shell, is formed through the steps (1) to (3). In the step (4), while maintaining the admicell mode, respective polymerization components are polymerized and converted into a polymer, whereby a wall material is formed. As a result, an encapsulated product having a very high-precision controlled structure can be obtained. Such an encapsulated product can satisfy all of (A) to (I) and (i) to (v) above.

In the production methods of an encapsulated product other than the above-described polymerization method, such as phase inversion emulsification method or acid precipitation method, an encapsulated product capable of satisfying all of (A) to (I) and (i) to (v) above cannot be obtained. The reason therefor is not clearly known but is considered because in the phase inversion emulsification method, acid precipitation method and the like, a previously produced polymer is used as the wall material for covering the core substance and therefore, the core substance-covering state of the wall material is not perfect (the core substance is not completely covered by the wall material).

As one characteristic feature of the production method of the present invention, an oil-soluble polymerization initiator is used as the polymerization initiator for use in the step (3). Specific examples of the oil-soluble polymerization initiator include an oil-soluble azo compound-based initiator such as dimethyl-2,2'-azobis(2-methylpropionate), 2,2'-azobis(2,4-dimethyl -valeronitrile) and 2,2'-azobis(2-methylbutyronitrile), and an organic peroxide such as benzoyl peroxide, dilauroyl peroxide, disuccinic acid peroxide, 1,1,3,3-tetramethylbutyl(peroxy-2-ethylhexanoate) and 2,5-dimethyl-2,5-di(2-ethyl-hexanoylperoxy)hexane. As a result of various investigations, the present inventors have found that when an oil-soluble polymerization initiator is used, as compared with the case using a water-soluble polymerization initiator, an encapsulated product having a diameter nearly equal to the particle diameter of an admicell formed before the polymerization reaction is obtained, the particle size distribution is narrow, the shape of the encapsulated product is uniform, and the amount of by-products (for example, a particulate material formed by the polymerization of a polymerization component without a core substance) produced other than the objective encapsulated product is small. The present invention has been accomplished based on this finding. The reason why such effects are obtained by using an oil-soluble polymerization initiator is not clearly known, but one of the causes is considered to reside in that the oil-soluble initiator dissolved in the hydrophobic monomer in the admicell is decomposed to generate an initiator radical and respective polymerization components (ionic polymerizable surfactant A, ionic polymerizable surfactant B, hydrophobic monomer) in the admicell are thereby polymerized.

The steps (1) to (4) are described in detail below.

As a preparatory step before practicing the step (1), there is a step of preparing an aqueous solvent containing "a core substance having an electric charge on the surface". As for this "core substance having an electric charge on the surface", not only a substance originally having an electric charge on the surface, but also a substance (surface-treated substance) after introducing a functional group or chemical substance having an electric charge by utilizing a physical action such as chemical reaction or adsorption, into a substance on which surface an electric charge is originally not present or if any, a very low electric charge is present (for example, an insulating material or an organic pigment), may be used. Specific examples of the surface-treated substance include those described in "Surface Treatment of Pigment Particle with Hydrophilic Group-Imparting Agent" of JP-A-2005-97476 (paragraphs [0036] to [0056]) previously filed by the present applicant.

Also, for producing "a core substance having adsorbed to the surface thereof an ionic surfactant having an ionic group and a hydrophobic group" like the core substance 1 shown in FIG. 3, in the case where the core substance is a solid matter such as pigment particle, it is preferred to add and mix the core substance in an ion-exchanged water having dissolved therein the ionic surfactant, subject the resulting mixed solution to a dispersion treatment in a general dispersing device such as ball mill, roll mill, Eiger mill or jet mill, and thereby sufficiently adsorb the ionic surfactant to the core substance. Furthermore, the mixed solution after the dispersion treatment is preferably subjected to ultrafiltration or the like so as to reduce the ionic surfactant not adsorbed to the core substance. If the non-adsorbed ionic surfactant is present in a large amount, the amount of a polymer particle produced as a by-product is increased and insufficient encapsulation of the core substance may result. However, if the amount of the non-adsorbed ionic surfactant is excessively reduced, the dispersion of the core substance becomes unstable in some cases. Therefore, it is preferred to appropriately determine the degree of ultrafiltration or the like by taking into consideration the dispersion stability and encapsulated condition of the core substance.

The substance adsorbed to the surface of the core substance is not limited to the "ionic surfactant having an ionic group and a hydrophobic group" but may be "an ionic polymerizable surfactant having an ionic group, a hydrophobic group and a polymerizable group". In view of dispersion of the core substance in the dispersion medium, "a nonionic surfactant having a nonionic group and a hydrophobic group" or "a nonionic polymerizable surfactant having a nonionic group, a hydrophobic group and a polymerizable group" may be used in combination.

The core substance-containing aqueous solvent (dispersion) is preferably an aqueous solvent mainly comprising water such as deionized water. In addition to the core substance, the aqueous solvent may contain, for example, various auxiliary agents for aiding the dissolution and dispersion of the core substance, or an organic solvent, if desired.

In the step (1), after the ionic polymerizable surfactant A is added to the core substance-containing aqueous solvent (dispersion), an ultrasonic wave is preferably irradiated on the solvent so as to facilitate the ionic adsorption of the ionic group of the ionic polymerizable surfactant A to the ionic group on the core substance surface.

In the step (1), the amount of the ionic polymerizable surfactant A added to the core substance-containing dispersion is preferably from 0.5 to 2-fold mol, more preferably from 0.8 to 1.2-fold mol, based on the total molar number of the ionic group on the core substance surface (that is, the amount [mol/g] of the ionic group present on the core substance surface of 1 g of the core substance used). When the amount added is 0.5-fold mol or more, an encapsulated product having good dispersibility can be obtained by the subsequent polymerization reaction. This is considered to occur because the core substance can be thoroughly covered with the ionic polymerizable surfactant A. On the other hand, when the amount added is 2-fold mol or less, production of a polymer particle without a core substance (a particle comprising only the polymer) can be suppressed. This is considered to result because the amount of the ionic polymerizable surfactant A not adsorbed to the core substance can be reduced.

In the step (2), the amount of the ionic polymerizable surfactant B added to the dispersion after the step (1) is preferably a value obtained from the surface area determined on the condition that the hydrophobic monomer added in the next step (3) is held in the admicell and converted into a polymer by the polymerization reaction and a spherical encapsulated product is obtained, and the molecular occupying area of the ionic polymerizable surfactant B. However, in the case where a polymer particle or a massive material is produced other than the encapsulated product, it is preferred to appropriately determine an optimal amount based on the amount added above.

In the step (2), if desired, "a nonionic polymerizable surfactant C having a nonionic group, a hydrophobic group and a polymerizable group" may be added and mixed together with the ionic polymerizable surfactant B, in the aqueous solvent (dispersion). By virtue of using a nonionic polymerizable surfactant C, particularly when an encapsulated product using a color material particle such as pigment for the core substance is used as the color material of an inkjet recording ink, high color formation and high print density are obtained on plain paper and high gloss and high image clarity are obtained on the inkjet special media.

Figure 5:
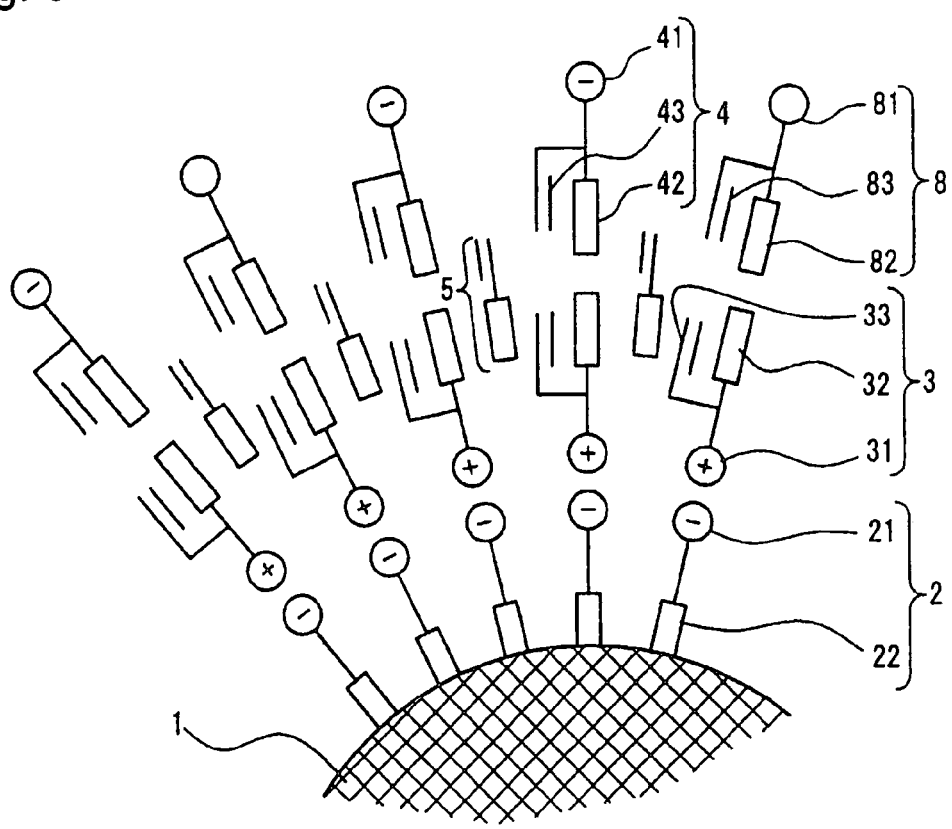
FIG. 5 is a schematic view showing the dispersed state of each substance when a nonionic polymerizable surfactant C (8) is further used in the dispersion state shown in FIG. 3.

FIG. 5 shows the state of a micell formed when a nonionic polymerizable surfactant C is added and mixed in the aqueous solvent (dispersion). Out of the numerals in FIG. 5, as for the same numerals as the numerals in FIG. 3, the descriptions in FIG. 3 are applied.

In the micell shown in FIG. 5, together with the hydrophobic group 42 and polymerizable group 43 of the anionic polymerizable surfactant 4 (ionic polymerizable surfactant B), the hydrophobic group 82 and polymerizable group 83 of the nonionic polymerizable surfactant 8 (nonionic polymerizable surfactant C) face respectively the hydrophobic group 32 and polymerizable group 33 of the cationic polymerizable surfactant 3 (ionic polymerizable surfactant A) adsorbed to the surface of the core substance 1 through the anionic surfactant 2 and at the same time, the anionic group 41 of the anionic polymerizable surfactant 4 and the nonionic group 81 of the nonionic polymerizable surfactant 8 each is present in the direction where the aqueous solvent is present, that is, in the direction remotest from the core substance 1. The hydrophobic monomer 5 is present in a hydrophobic phase formed resulting from the hydrophobic group 32 and polymerizable group 33 of the cationic polymerizable surfactant 3, the hydrophobic group 42 and polymerizable group 43 of the anionic polymerizable surfactant 4, and the hydrophobic group 82 and polymerizable group 83 of the nonionic polymerizable surfactant 8 facing each other. The encapsulated product of the present invention can be suitably used also by passing through the formation of such a micell.

In the step (2), as for the amount of the nonionic polymerizable surfactant C added to the dispersion passed through the step (1), the surface area determined from the sum of amounts added of the ionic polymerizable surfactant B and nonionic polymerizable surfactant C and respective molecular occupying areas is preferably made equal to the surface area determined on the condition that the hydrophobic monomer added in the next step (3) is held in the admicell and converted into a polymer by the polymerization reaction and a spherical encapsulated product is obtained. The ratio between ionic polymerizable surfactant B and nonionic polymerizable surfactant C added is appropriately determined according to the property required of the encapsulated product obtained, within the range of the above-described sum of amounts added. However, in the case where a polymer particle or a massive material is produced other than the encapsulated product, it is preferred to appropriately determine an optimal amount based on the amount added above.

In the step (3), it is preferred to add and dissolve an oil-soluble polymerization initiator in a hydrophobic monomer and add and mix the obtained monomer solution in the dispersion passed through the step (2).

In the step (3), the amount added of the hydrophobic monomer is appropriately determined according to the particle diameter of the encapsulated product or the thickness of the polymer layer (wall material) coating the core substance.

In the step (3), the amount added of the oil-soluble polymerizable initiator is preferably from 1 to 5 wt %, more preferably from 2 to 4 wt %, based n the polymerization components (ionic polymerizable surfactant A, ionic polymerizable surfactant B, hydrophobic monomer, nonionic polymerizable surfactant C, other polymerization components) constituting the polymer layer (wall material). If the amount added is less than 1 wt %, the polymerization may not satisfactorily proceed, whereas if the amount added exceeds 5 wt %, a polymer layer having a low molecular weight may be formed and the coating film strength or chemical resistance may be deteriorated.

It is presumed that through the steps (1) to (3), as described above, an ionic polymerizable surfactant A having the opposite electric charge to the electric charge on the surface of the core substance is electrostatically adsorbed to the surface of the core substance having an electric charge on the surface, the hydrophobic monomer is localized on the outer side, and the ionic polymerizable surfactant B is oriented on the further outer side by allowing the ionic group to face the aqueous phase side, whereby an admicell is formed.

In those steps, other than the addition of the ionic polymerizable surfactant B and the hydrophobic monomer to the solvent in the order of the steps above, these two members may be added in the reverse order or at the same time, but the addition in the order other than the above-described steps [(1), (2) and (3)] tends to bring about widening of the particle size distribution. Therefore, addition in the order of the above-described steps [(1), (2) and (3)] is preferred.

In the production method of the present invention, if desired, polymerization components (described later) other than the above-described polymerization components (ionic polymerizable surfactant A, ionic polymerizable surfactant B, hydrophobic monomer, nonionic polymerizable surfactant C) may be used within the range of not impairing the effects of the present invention, In the case of using other polymerization components, these other polymerization components are preferably added and mixed in the solvent after the step (3) but before the step (4).

In the step (4), the oil-soluble polymerization initiator added in the step (3) is activated and respective polymerization components are thereby polymerized.

The activation of the oil-soluble polymerization initiator can be suitably performed by elevating the temperature in the reaction system (solvent) up to a temperature at which the oil-soluble polymerization initiator is cleaved and an initiator radical is generated. When the oil-soluble polymerization initiator added is cleaved and an initiator radical generated, the initiator radical attacks the polymerizable groups of ionic polymerizable surfactants A and B, hydrophobic monomer and other polymerization components (polymerizable monomer), whereby a polymerization reaction occurs. The polymerization temperature and polymerization reaction time vary depending on the kind of the oil-soluble polymerization initiator used and the kind of the polymerizable monomer, but it is easy for one skilled in the art to appropriately set preferred polymerization conditions. In general, the polymerization temperature is preferably from 40 to 90° C., and the polymerization time is preferably from 3 to 12 hours.

In the polymerization reaction performed in the step (4), since ionic polymerizable surfactants are used, good solubilization of each polymerization component such as hydrophobic monomer into the admicell is attained. Accordingly, use of a surfactant is not necessarily required but, if desired, one or more members selected from the group consisting of known anionic, nonionic and cationic surfactants may be used.

After the step (4) (after the completion of polymerization), the pH of the aqueous dispersion of the obtained encapsulated product is adjusted. The pH is adjusted to the range from 7.0 to 9.0 when an anionic polymerizable surfactant is used as the ionic polymerizable surfactant B, and is adjusted to the range from 4.0 to 6.0 when a cationic polymerizable surfactant is used. After the pH is adjusted, it is preferred to remove coarse particles through a membrane filter or the like and remove the unreacted monomer (a monomer not used for the reaction or a by-product such as polymerizable compound) derived from the monomer (for example, the ionic polymerizable surfactant A or B or the hydrophobic monomer) used for the production of the encapsulated product, salts and the like by, for example, ultrafiltration or centrifugal filtration to reduce the content percentages thereof. In particular, the amount of the unreacted monomer is preferably 50,000 ppm or less, more preferably 10,000 ppm or less, in the aqueous dispersion. The amount of the unreacted monomer can be easily measured using gas chromatography or liquid chromatography of the measurement sample, with the control being a sample containing an unreacted monomer having a known concentration.

In the aqueous dispersion of the encapsulated product produced through the steps (1) to (4), the encapsulated product has high dispersion stability in the aqueous dispersion, and this is considered to result because the core substance is completely covered with a wall material comprising a polymer as the main component (there is no uncovered portion) and at the same time, a hydrophilic group regularly oriented toward the aqueous solvent is present in the outermost shell of the wall material.

When this aqueous dispersion is used for the inkjet recording ink, a high-quality image with high color saturation, high print density (printing density) and reduced blurring can be output on the plain paper, and an image further having good glossiness can be output on the inkjet recording special media, particularly inkjet gloss media.

Various raw materials used in the production method of the present invention are described below.

[Core Substance]

The core substance for use in the present invention is not particularly limited, but examples thereof include a color material, an inorganic material, an organic material, an inorganic-organic composite particle, an inorganic colloid, a polymer particle and a metal oxide (e.g., silica, titania). One of these may be used, or two or more thereof may be used in combination. For example, even when a dangerous drug or the like is intended to use as the organic material, the encapsulated product of the present invention provides an effect of improving the handling property of such a dangerous drug or the like. When the encapsulated inorganic-organic composite particle is used as a filler of a resin molded article or the like, the characteristics of the molded article can be enhanced. The encapsulated inorganic colloid can be used for a hardcoat layer having high transparency. The color material includes a pigment such as inorganic pigment or organic pigment capable of forming a desired color, and a dye insoluble or sparingly soluble in water, such as disperse dye and oil-soluble dye. In the case of producing an encapsulated product by using a color material as the core substance, the encapsulated product can be used as a colorant for a paint, a pigment ink, a toner or the like. The method for imparting an electric charge to the core substance surface is as described above.

Examples of the inorganic pigment (color material) usable as the core substance include carbon blacks (C.I. Pigment Black 7) such as furnace black, lamp black, acetylene black and channel black, and an iron oxide pigment.

Examples of the organic pigment usable as the core substance include an azo pigment (e.g., azo lake, insoluble azo pigment, condensed azo pigment, chelate azo pigment), a polycyclic pigment (e.g., phthalocyanine pigment, perylene pigment, perinone pigment, anthraquinone pigment, quinacridone pigment, dioxane pigment, thioindigo pigment, isoindolinone pigment, quinofuranone pigment), a dye chelate (e.g., basic dye-type chelate, acidic dye-type chelate), a nitro pigment, a nitroso pigment and aniline black.

More specifically, examples of the inorganic pigment which is used for black coloring include the following carbon black: No. 2300, No. 900, MCF88, No. 33, No. 40, No. 45, No. 52, MA7, MA8, MA100 and No. 2200B, all produced by Mitsubishi Chemical Co. Ltd.; Raven 5750, Raven 5250, Raven 5000, Raven 3500, Raven 1255 and Raven 700, all produced by Columbia; Regal 400, Regal 330, Regal 660R, Mogul L, Monarch 700, Monarch 800, Monarch 880, Monarch 900, Monarch 1000, Monarch 1100, Monarch 1300 and Monarch 1400, all produced by Cabot; and Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A and Special Black 4, all produced by Degussa.

As for the organic pigment for black, a black organic pigment such as aniline black (C.I. Pigment Black 1) may be used.

Examples of the organic yellow pigment include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, C.I. Pigment Yellow 167, C.I. Pigment Yellow 172 and C.I. Pigment Yellow 180.

Examples of the organic magenta pigment include C.I. Pigment Red 1, C.I. Pigment Red 2, C.I. Pigment Red 3, C.I. Pigment Red 4, C.I. Pigment Red 5, C.I. Pigment Red 6, C.I.

Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48 (Ca), C.I. Pigment Red 48 (Mn), C.I. Pigment Red 57 (Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43 and C.I. Pigment Violet 50.

Examples of the organic cyan pigment include C.I. Pigment Blue 1, C.I. Pigment Blue 2, C.I. Pigment Blue 3, C.I. Pigment Blue 15, C.I. Pigment Blue 15:1, C.I. Pigment Blue 15:2, C.I. Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4 and C.I. Vat Blue 60.

Examples of the organic pigment other than magenta, cyan and yellow include C.I. Pigment Green 7, C.I. Pigment Green 10, C.I. Pigment Brown 3, C.I. Pigment Brown 5, C.I. Pigment Brown 25, C.I. Pigment Brown 26, C.I. Pigment Orange 1, C.I. Pigment Orange 2, C.I. Pigment Orange 5, C.I. Pigment Orange 7, C.I. Pigment Orange 13, C.I. Pigment Orange 14, C.I. Pigment Orange 15, C.I. Pigment Orange 16, C.I. Pigment Orange 24, C.I. Pigment Orange 34, C.I. Pigment Orange 36, C.I. Pigment Orange 38, C.I. Pigment Orange 40, C.I. Pigment Orange 43 and C.I. Pigment Orange 63.

In the present invention, other than these organic pigments, a dye insoluble or sparingly soluble in water, such as disperse dye and oil-soluble dye may also be suitably used.

The average particle diameter of the core substance is not limited, and the average particle diameter of the core substance is appropriately selected according to the usage of the encapsulated product. For example, in the case of using the encapsulated product as a color material for inkjet recording inks, the average particle diameter of the core substance is preferably 150 nm or less, more preferably 80 nm or less, still more preferably from 5 to 50 nm (the average particle diameter as used herein is a value measured by the laser light-scattering method). When the average particle diameter of the core substance is in the above-described range, the inkjet recording ink is assured of excellent reliability such as dispersion stability and ejection stability and at the same time, enables output of a high-quality image.

[Ionic Polymerizable Surfactant A]

The ionic polymerizable surfactant A is a polymerization component of the polymer as the main component of the wall material covering the core substance and contains an ionic group having the opposite electric charge to the electric charge on the core substance surface, a hydrophobic group and a polymerizable group.

The ionic group includes an anionic group and a cationic group. The ionic polymerizable surfactant having a cationic group as the ionic group is referred to as "a cationic polymerizable surfactant" and the ionic polymerizable surfactant having an anionic group as the ionic group is referred to as "an anionic polymerizable surfactant". In the present invention, a cationic polymerizable surfactant and an anionic polymerizable surfactant both may be used as the ionic polymerizable surfactant A, and either one may be appropriately selected according to the usage of the encapsulated product.

The cationic group (ionic group) is preferably a cationic group selected from the group consisting of a primary ammonium cation, a secondary ammonium cation, a tertiary ammonium cation and a quaternary ammonium cation. Examples of the primary ammonium cation include a monoalkylammonium cation ($RNH_3^+$); examples of the secondary ammonium cation include a dialkylammonium cation ($R_2NH_2^+$); examples of the tertiary ammonium cation include a trialkylammonium cation ($R_3NH^+$); and examples of the quaternary ammonium cation include ($R_4N^+$). Here, R is a hydrophobic group, and examples thereof include those described below. Also, examples of the counter anion of the above-described cationic group include $Cl^-$, $Br^-$, $I^-$, $CH_3OSO_3^-$ and $C_2H_5OSO_3^-$.

Examples of the anionic group (ionic group) include a sulfonic acid group ($-SO_3^-$), a sulfinic acid group ($-SO_2^-$), a sulfuric acid ester group ($-OSO_3^-$), a carboxyl group ($-COO^-$), a phosphoric acid group ($=O_2PO(O^-)$, $-OPO(O^-)_2$), a phosphorous acid group ($=O_2PO^-$, $-OP(O^-)_2$), a phosphonic acid group ($-PO_2(O^-)$, $-PO(O^-)_2$), a sulfinic acid ester group ($-OSO_2^-$) and a phosphoric acid ester group. These are used in the form of a salt. Specific preferred examples include salts selected from a sulfonate salt ($-SO_3M$), a sulfinate salt ($-SO_2M$), a sulfuric acid ester salt ($-OSO_3M$), a carboxylate salt ($-COOM$), a phosphate salt ($=O_2PO(OM)$, $-OPO(OM)_2$), a phosphite salt ($=O_2POM$, $-OP(OM)_2$), a phosphonate salt ($-PO_2(OM)$, $-PO(OM)_2$), a sulfinic acid ester salt ($-OSO_2M$) and a phosphoric acid ester salt. M is hydrogen, an alkali metal, an alkaline earth metal, $NH_4$, amine, ethanol amine or the like.

The hydrophobic group is preferably one member or two or more members selected from the group consisting of an alkyl group having a carbon number of 8 to 16, and an aryl group such as phenyl group and phenylene group, and may contain both an alkyl group and an aryl group within the molecule.

The polymerizable group is preferably an unsaturated hydrocarbon group capable of radical polymerization, and specific preferred examples thereof include groups selected from the group consisting of a vinyl group, an allyl group, an acryloyl group, a methacryloyl group, a propenyl group, a vinylidene group and a vinylene group. Among these, an allyl group, a methacryloyl group and an acryloyl group are more preferred.

The cationic polymerizable surfactant includes, for example, a compound represented by the formula: $R_{[4-(1+m+n)]}R^1{}_lR^2{}_mR^3{}_nN^+ \cdot X^-$ (wherein R is a polymerizable group, $R^1$, $R^2$ and $R^3$ each is an alkyl group having a carbon number of 8 to 16 or an aryl group such as phenyl group or phenylene group, $X^{31}$ is $Cl^-$, $Br^-$, $I^-$, $CH_3OSO_3^-$ or $C_2H_5OSO_3^-$, and l, m and n each is 1 or 0). Here, examples of the polymerizable group include those described above.

Specific examples of the cationic polymerizable surfactant include dimethylaminoethylmethacrylate octyl chloride salt, dimethylaminoethylmethacrylate cetyl chloride salt, dimethylaminoethylmethacrylate decyl chloride salt, dimethylaminoethylmethacrylate dodecyl chloride salt, dimethylaminoethylmethacrylate tetradecyl chloride salt and diallylmethyldodecylammonium bromide.

In the present invention, one of these cationic polymerizable surfactants may be used alone, or two or more thereof may be used as a mixture.

Specific examples of the anionic polymerizable surfactant include anionic allyl derivatives described in JP-B-49-46291, JP-B-1-24142 and JP-A-62-104802; anionic propenyl derivatives described in JP-A-62-221431; anionic acrylic acid derivatives described in JP-A-62-34947 and JP-A-55-11525; and anionic itaconic acid derivatives described in JP-B-46-34898 and JP-A-51-30284.

The anionic polymerizable surfactant for use in the present invention is preferably, for example, a compound represented by the following formula (31):

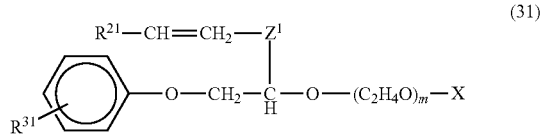
(31)

[wherein $R^{21}$ and $R^{31}$ each is independently a hydrogen atom or a hydrocarbon group having a carbon number of 1 to 12, $Z^1$ is a carbon-carbon single bond or a group represented by the formula: —$CH_2$—O—$CH_2$—, m is an integer of 2 to 20, X is a group represented by the formula: —$SO_3M^1$, and $M^1$ is an alkali metal, an ammonium salt or an alkanolamine], or a compound represented by the following formula (32):

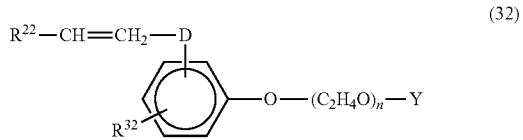
(32)

[wherein $R^{22}$ and $R^{32}$ each is independently a hydrogen atom or a hydrocarbon group having a carbon number of 1 to 12, D is a carbon-carbon single bond or a group represented by the formula: —$CH_2$—O—$CH_2$—, n is an integer of 2 to 20, Y is a group represented by the formula: —$SO_3M^2$, and $M^2$ is an alkali metal, an ammonium salt or an alkanolamine].

Examples of the compound (anionic polymerizable surfactant) represented by formula (31) include the compounds described in JP-A-5-320276 and JP-A-10-316909. The hydrophilicity on the surface of the encapsulated product obtained by encapsulating the core substance can be adjusted by appropriately selecting the number of m in formula (31). The polymerizable surfactant represented by formula (31) is preferably a compound represented by the following formula (310), and specific examples thereof include the compounds represented by the following formulae (31a) to (31d).

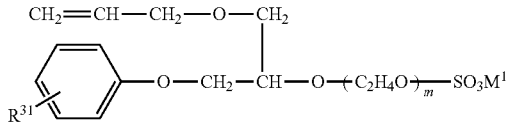
(310)

[wherein $R^{31}$, m and $M^1$ are the same as those in the compound represented by formula (31)].

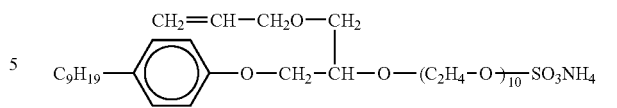
(31a)

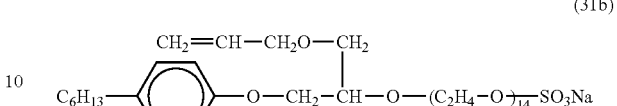
(31b)

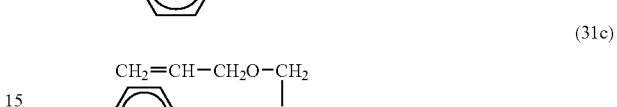
(31c)

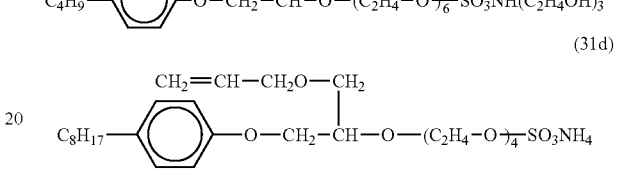
(31d)

As for the compound (anionic polymerizable surfactant) represented by formula (310), a commercially available product may also be used. For example, ADEKA REARSOPE SE-10N produced by Asahi Denka Co., Ltd. is a compound where in the compound represented by formula (310), $M^1$ is $NH_4$, $R^{31}$ is $C_9H_{19}$ and m=10, and ADEKA REARSOPE SE-20N produced by Asahi Denka Co., Ltd. is a compound where in the compound represented by formula (310), $M^1$ is $NH_4$, $R^{31}$ is $C_9H_{19}$ and m=20.

Also, the anionic polymerizable surfactant for use in the present invention is preferably, for example, a compound represented by the following formula (33):

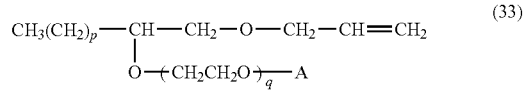
(33)

[wherein p is 9 or 11, q is an integer of 2 to 20, A is a group represented by —$SO_3M^3$, and $M^3$ is an alkali metal, an ammonium salt or an alkanolamine]. The anionic polymerizable surfactant represented by formula (33) is preferably a compound shown below.

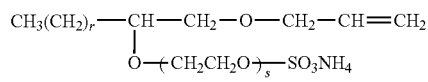

[wherein r is 9 or 11, and s is 5 or 10].

As regards the compounds (anionic polymerizable surfactant) represented by formula (33) and the formula in [Chem. 9], a commercially available product may also be used. Examples of the commercially available product include AQUALON KH Series (AQUALON KH-5 and AQUALON KH-10) (both are trade names) produced by Dai-ichi Kogyo Seiyaku Co., Ltd. AQUALON KH-5 is a mixture of a compound where in the compound represented by formula (33), r is 9 and s is 5, and a compound where r is 11 and s is 5, and AQUALON KH-10 is a mixture of a compound where in the compound represented by the formula in [Chem. 9], r is 9 and s is 10, and a compound where r is 11 and s is 10.

Furthermore, the anionic polymerizable surfactant for use in the present invention is preferably a compound represented by the following formula (34):

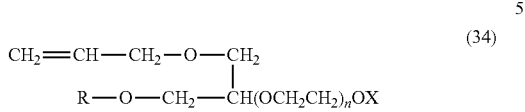

[wherein R is an alkyl group having a carbon number of 8 to 15, n is an integer of 2 to 20, X is a group represented by —$SO_3B$, and B is an alkali metal, an ammonium salt or an alkanolamine].

As for the compound (anionic polymerizable surfactant) represented by formula (34), a commercially available product may also be used. Examples of the commercially available product include ADEKA REARSOPE SR Series (ADEKA REARSOPE SR-10, SR-20 and SR-1025) (all trade names) produced by Asahi Denka Co., Ltd. ADEKA REARSOPE SR Series is a compound where in formula (34), B is $NH_4$. SR-10 is a compound where n=10, and SR-20 is a compound where n=20.

As regards the anionic polymerizable surfactant for use in the present invention, a compound represented by the following formula (A) may also be used.

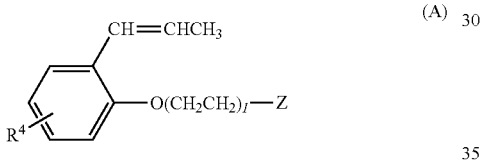

[wherein $R^4$ represents a hydrogen atom or a hydrocarbon group having a carbon number of 1 to 12, l represents a number of 2 to 20, and $M^4$ represents an alkali metal, an ammonium salt or an alkanolamine].

As for the compound (anionic polymerizable surfactant) represented by formula (A), a commercially available product may also be used. Examples of the commercially available product include AQUALON HS Series (AQUALON HS-10, HS-20 and HS-1025) (all trade names) produced by Dai-ichi Kogyo Seiyaku Co., Ltd.

Also, the anionic polymerizable surfactant for use in the present invention includes, for example, a sodium alkylallyl-sulfosuccinate represented by the following formula (35).

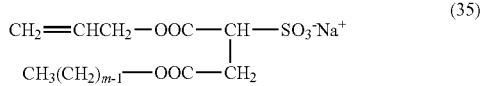

(m = 12 or 16)

As for the compound (anionic polymerizable surfactant) represented by formula (35), a commercially available product may also be used. Examples of the commercially available product include ELEMINOL JS-2 produced by Sanyo Chemical Industries, Ltd., and this is a compound where in formula (35), m=12.

Furthermore, the anionic polymerizable surfactant for use in the present invention includes, for example, a sodium methacryloyloxy polyoxyalkylene sulfate represented by the following formula (36). In formula (36), n is a number of 1 to 20.

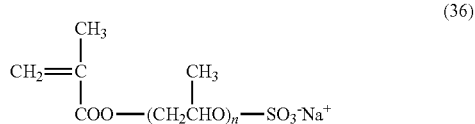

As for the compound (anionic polymerizable surfactant) represented by formula (36), a commercially available product may also be used. Examples of the commercially available product include ELEMINOL RS-30 produced by Sanyo Chemical Industries, Ltd., and this is a compound where in formula (36), n=9.

Also, as regards the anionic polymerizable surfactant for use in the present invention, for example, a compound represented by the following formula (37) may be used.

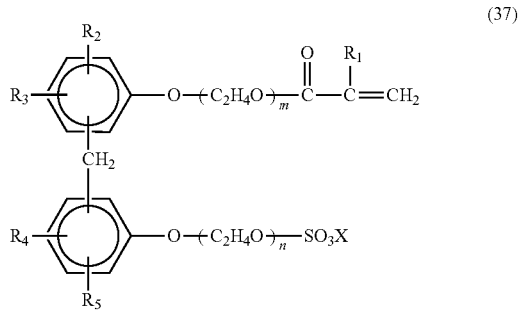

[wherein $R_1$ represents a hydrogen atom or a methyl group, $R_2$ and $R_4$, which may be the same or different, each represents a hydrogen atom or an alkyl group, $R_3$ and $R_5$, which may be the same or different, each represents a hydrogen atom, an alkyl group, a benzyl group or a styrene group, X represents an alkali metal atom, an alkaline earth metal atom, an ammonium or an amine cation, m represents 0 or an integer of 1 or more, and n represents an integer of 1 or more].

As for the compound (anionic polymerizable surfactant) represented by formula (37), a commercially available product may also be used. The commercially available product includes, for example, Antox MS-60 produced by Nippon Nyukazai Co., Ltd., and this is a compound where in formula (37), $R_1$ is a methyl group, $R_2$, $R_3$, $R_4$ and $R_5$ each is a hydrogen atom or an alkyl group, m and n each is a positive integer, and X is ammonium.

One of these anionic polymerizable surfactants may be used alone, or two or more thereof may be used as a mixture.

[Ionic Polymerizable Surfactant B]

The ionic polymerizable surfactant B for use in the present invention is a polymerization component of the polymer as the main component of the wall material covering the core substance and contains an ionic group having the same or opposite electric charge to the electric charge on the core substance surface, a hydrophobic group and a polymerizable group. As for the ionic group, hydrophobic group and polymerizable group, the same as those described above in the paragraph of "Ionic Polymerizable Surfactant A" may be used. Also, the same as the cationic polymerizable surfactant or anionic polymerizable surfactant described in the paragraph of "Ionic Polymerizable Surfactant A" can be used as the ionic polymerizable surfactant B.

[Hydrophobic Monomer]

The hydrophobic monomer is effective in controlling the film-forming property of the encapsulated product as well as the strength, chemical resistance, water resistance, light resistance, weather resistance, optical property and other physical or chemical properties of the wall material. In particular, when the encapsulated product is used as the color material of the inkjet recording ink, this is effective in view of satisfying the required properties such as fixing of the color material and scratch resistance, water resistance and solvent resistance of the printed part.

The hydrophobic monomer for use in the present invention is a monomer having at least a hydrophobic group and a polymerizable group in its structure, and examples thereof include those containing a hydrophobic group selected from the group consisting of an aliphatic hydrocarbon group, an alicyclic hydrocarbon group and an aromatic hydrocarbon group. Examples of the aliphatic hydrocarbon group include a methyl group, an ethyl group and a propyl group; examples of the alicyclic hydrocarbon group include a cyclohexyl group, a dicyclopentenyl group, a dicyclopentanyl group and an isobornyl group; and examples of the aromatic hydrocarbon group include a benzyl group, a phenyl group and a naphthyl group.

As for the polymerizable group of the hydrophobic monomer, the same as those described above in the paragraph of "Ionic Polymerizable Surfactant A" can be used.

Specific examples of the hydrophobic monomer include styrene derivatives such as styrene, methylstyrene, vinyltoluene, dimethylstyrene, chlorostyrene, dichloro-styrene, tert-butylstyrene, bromostyrene and p-chloro-methylstyrene; monofunctional acrylic esters such as methyl acrylate, ethyl acrylate, isopropyl acrylate, n-butyl acrylate, butoxyethyl acrylate, isobutyl acrylate, n-amyl acrylate, isoamyl acrylate, n-hexyl acrylate, octyl acrylate, decyl acrylate, dodecyl acrylate, octadecyl acrylate, benzyl acrylate, phenyl acrylate, phenoxyethyl acrylate, cyclohexyl acrylate, dicyclopentanyl acrylate, dicyclopentenyl acrylate, dicyclopentenyloxyethyl acrylate, tetrahydrofurfuryl acrylate, isobornyl acrylate, isoamyl acrylate, lauryl acrylate, stearyl acrylate, behenyl acrylate, ethoxydiethylene glycol acrylate, methoxy-triethylene glycol acrylate, methoxydipropylene glycol acrylate, phenoxypolyethylene glycol acrylate, nonylphenol EO adduct acrylate, isooctyl acrylate, isomyristyl acrylate, isostearyl acrylate, 2-ethylhexyl diglycol acrylate and octoxypolyethylene glycol polypropylene glycol mono-acrylate; monofunctional methacrylic esters such as methyl methacrylate, ethyl methacrylate, isopropyl methacrylate, n-butyl methacrylate, i-butyl methacrylate, tert-butyl methacrylate, n-amyl methacrylate, isoamyl methacrylate, n-hexyl methacrylate, 2-ethylhexyl methacrylate, lauryl methacrylate, tridecyl methacrylate, stearyl methacrylate, isodecyl methacrylate, octyl methacrylate, decyl methacrylate, dodecyl methacrylate, octadecyl methacrylate, methoxydiethylene glycol methacrylate, polypropylene glycol monomethacrylate, benzyl methacrylate, phenyl methacrylate, phenoxyethyl methacrylate, cyclohexyl methacrylate, tetrahydrofurfuryl methacrylate, tert-butylcyclohexyl methacrylate, behenyl methacrylate, dicyclopentanyl methacrylate, dicyclopentenyl methacrylate, dicyclo-pentenyloxyethyl methacrylate, butoxymethyl methacrylate, isobornyl methacrylate and octoxypolyethylene glycol polypropylene glycol monomethacrylate; allyl compounds such as allylbenzene, allyl-3-cyclohexane propionate, 1-allyl-3, 4-dimethoxybenzene, allyl phenoxyacetate, allyl phenyl-acetate, allylcyclohexane and allyl polyvalent carboxylate; unsaturated esters of fumaric acid, maleic acid, itaconic acid or the like; and radical polymerizable group-containing monomers such as N-substituted maleimide and cyclic olefin. One of these monomers may be used alone, or two or more thereof may be used in combination.

[Nonionic Polymerizable Surfactant C]

The nonionic polymerizable surfactant C for use in the present invention has a nonionic group, a hydrophobic group and a polymerizable group. Examples of the nonionic group include a hydroxyl group, a polyoxyethylene group and a polyglycerin group. As for the hydrophobic group and polymerizable group, the same as those described above in the paragraph of "Ionic Polymerizable Surfactant A" can be used.

As regards the nonionic polymerizable surfactant C for use in the present invention, a compound represented by the following formula (100) may be used.

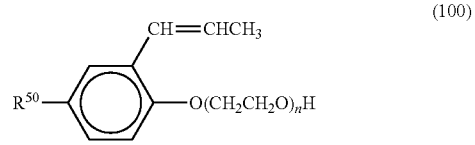

(100)

[wherein $R^{50}$ represents a hydrogen atom or a hydrocarbon group having a carbon number of 1 to 12, and n represents a number of 5 to 50].

As for the compound (nonionic polymerizable surfactant C) represented by formula (100), a commercially available product may also be used. Examples of the commercially available product include AQUALON RN Series (AQUALON RN-10, RN-20, RN-30, RN-50 and RN-2025) (all trade names) produced by Dai-ichi Kogyo Seiyaku Co., Ltd. The following formula (101) shows AQUALON RN-20.

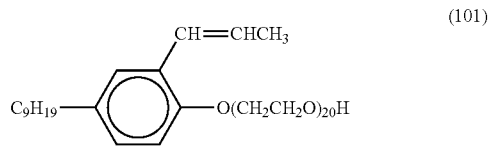

(101)

As regards the nonionic polymerizable surfactant C for use in the present invention, a compound represented by the following formula (103) may be used.

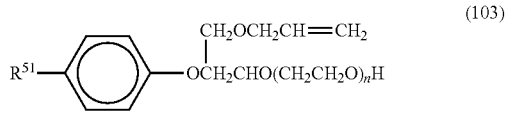

(103)

[wherein $R^{51}$ represents a hydrogen atom or a hydrocarbon group having a carbon number of 1 to 12, and n represents a number of 5 to 50].

As for the compound (nonionic polymerizable surfactant C) represented by formula (103), a commercially available product may also be used. Examples of the commercially available product include NOIGEN Series (NOIGEN N-10, N-20, N-30 and N-50) (all trade names) produced by Dai-ichi Kogyo Seiyaku Co., Ltd. The following formula (104) shows NOIGEN N-20.

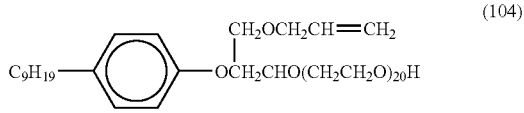
(104)

As regards the nonionic polymerizable surfactant C for use in the present invention, a compound represented by the following formula (105) may be used.

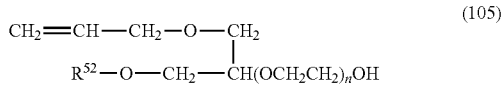
(105)

[wherein $R^{52}$ is an alkyl group having a carbon number of 8 to 15, and n is an integer of 5 to 50].

As for the compound (nonionic polymerizable surfactant C) represented by formula (105), a commercially available product may also be used. Examples of the commercially available product include ADEKA REARSOPE ER Series (ADEKA REARSOPE ER-10, ER-20, ER-30 and ER-40) (all trade names) produced by Asahi Denka Co., Ltd. ER-10 is a compound where n=10, ER-20 is a compound where n=20, ER -30 is a compound where n=30, and ER-40 is a compound where n=40.

As regards the nonionic polymerizable surfactant C for use in the present invention, a compound represented by the following formula (106) may be used.

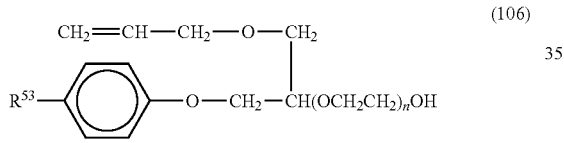
(106)

[wherein $R^{53}$ represents a hydrogen atom or a hydrocarbon group having a carbon number of 1 to 12, and n is a number of 5 to 50].

As for the compound (nonionic polymerizable surfactant C) represented by formula (106), a commercially available product may also be used. Examples of the commercially available product include ADEKA REARSOPE NE Series (ADEKA REARSOPE NE-5, NE-10, NE-20, NE-30 and NE-40) (all trade names) produced by Asahi Denka Co., Ltd. NE-5 is a compound where n=5, NE-10 is a compound where n=10, NE-20 is a compound where n=20, NE-30 is a compound where n=30, and NE-40 is a compound where n=40. The following formula (107) shows ADEKA REARSOPE NE-10.

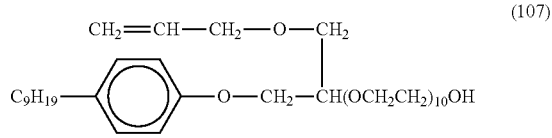
(107)

Examples of the nonionic polymerizable surfactant C for use in the present invention include poly(ethylene glycol-propylene glycol) monomethacrylate (trade name: BLEMMER 50PEP-300<produced by NOF Corp.>, formula (108) below), polyethylene glycol polypropylene glycol monomethacrylate (trade name: BLEMMER 70PEP-350B <produced by NOF Corp.>, formula (109) below), polyethylene glycol polypropylene glycol monoacrylate (trade name: BLEMMER AEP Series <produced by NOF Corp.>), poly(ethylene glycol-tetramethylene glycol) monoacrylate (trade name: BLEMMER AET Series <produced by NOF Corp.>), poly(propylene glycol-tetramethylene glycol) monoacrylate (trade name: BLEMMER APT Series <produced by NOF Corp.>), lauroxy polyethylene glycol monomethacrylate (trade name: BLEMMER PLE-200 <produced by NOF Corp.>, formula (110) below), lauroxy polyethylene glycol monoacrylate (trade name: BLEMMER ALE-200 and ALE-800<produced by NOF Corp.>, formula (111) below), stearoxy polyethylene glycol monomethacrylate (trade name: BLEMMER PSE-200, PSE-400 and PSE-1300 <produced by NOF Corp.>, formula (112) below), stearoxy polyethylene glycol-polypropylene glycol monoacrylate (trade name: BLEMMER ASEP Series <produced by NOF Corp.>, formula (113) below), nonylphenoxy polyethylene glycol monoacrylate (trade name: BLEMMER ANE-300 and ANE-1300 <produced by NOF Corp.>, formula (114) below), nonylphenoxy polyethylene glycol-polypropylene glycol monomethacrylate (trade name: BLEMMER PNEP Series <produced by NOF Corp.>, formula (115) below), nonylphenoxy polypropylene polyethylene glycol monomethacrylate (trade name: BLEMMER PNPE Series <produced by NOF Corp.>, formula (116) below), and nonylphenoxy poly(ethylene glycol-propylene glycol) monoacrylate (trade name: BLEMMER 43ANEP-500, 70ANEP-550 and 75ANEP-600<produced by NOF Corp.>).

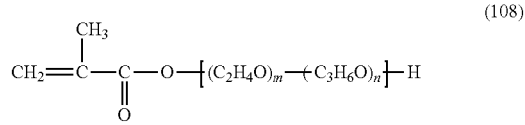
(108)

m: about 3.5
n: about 2.5

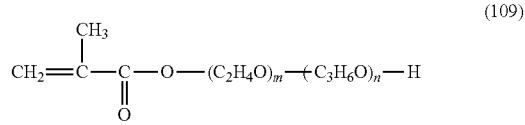
(109)

m: about 5
n: about 2

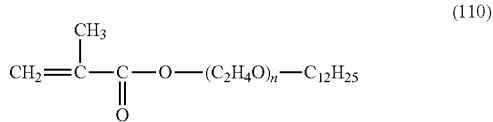
(110)

n: about 4

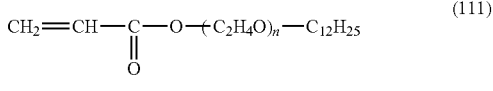
(111)

ALE-200 n: about 4
ALE-800 n: about 18

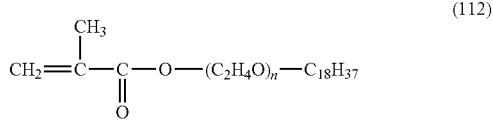
(112)

PSE-200 n: about 4
PSE-400 n: about 9
ALE-1300 n: about 30

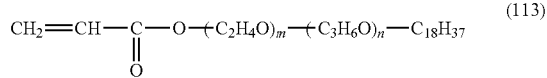

(113)

m: about 5
n: about 2

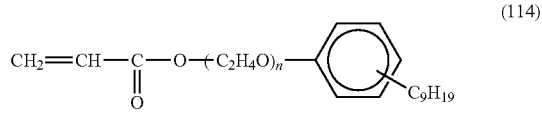

(114)

ANE-300 n: about 5
ANE-1300 n: about 30

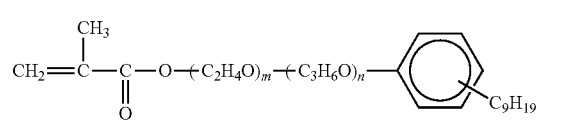

(115)

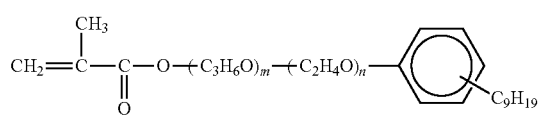

(116)

[Other Polymerization Components]

As regards the raw materials of the wall material for use in the present invention, polymerization components other than those polymerization components (ionic polymerizable surfactant A, ionic polymerizable surfactant B, hydrophobic monomer, nonionic polymerizable surfactant C) can be used, and examples thereof include a crosslinking monomer.

When a crosslinking structural unit derived from a crosslinking monomer is incorporated into the polymer which is the main component of the wall material, a crosslinked structure is formed in the polymer and the solvent resistance (a property that the solvent contained in the inkjet recording ink can hardly intrude into the inside of the polymer covering the core substance) can be enhanced. If the solvent intrudes into the inside of the polymer covering the core substance, the polymer undergoes swelling, deformation or the like and, for example, the aligned state of the anionic group orienting toward the aqueous medium side in the encapsulated product may be disturbed, giving rise to decrease in the dispersion stability or the like of the encapsulated product. In such a case, by forming a crosslinked structure in the polymer covering the core substance, the solvent resistance of the encapsulated product is enhanced and when an ink composition allowing the coexistence of a water-soluble organic solvent is produced, the dispersion stability of encapsulated product, the storage stability of ink composition, and the ejection stability of ink composition from inkjet head can be more elevated. Also, the hydrophobic monomer and the cross-linking monomer are copolymerized, whereby the mechanical strength or heat resistance of the polymer which is the main component of the wall material, is increased and the shape retentivity of the wall material is enhanced.

The crosslinking monomer for use in the present invention includes a compound having two or more unsaturated hydrocarbon groups which are at least one member selected from a vinyl group, an allyl group, an acryloyl group, a methacryloyl group, a propenyl group, a vinylidene group and a vinylene group. Specific examples of the crosslinking monomer include ethylene glycol diacrylate, diethylene glycol diacrylate, triethylene glycol diacrylate, tetraethylene glycol diacrylate, polyethylene glycol diacrylate, allyl acrylate, bis(acryloxyethyl)hydroxyethyl isocyanurate, bis(acryloxyneopentyl glycol)adipate, 1,3-butylene glycol diacrylate, 1,6-hexanediol diacrylate, neopentyl glycol diacrylate, propylene glycol diacrylate, polypropylene glycol diacrylate, 2-hydroxy-1,3-diacryloxypropane, 2,2-bis[4-(acryloxy) phenyl]propane, 2,2-bis[4-(acryloxyethoxy)-phenyl]propane, 2,2-bis[4-(acryloxyethoxy diethoxy)-phenyl]propane, 2,2-bis[4-(acryloxyethoxy polyethoxy)-phenyl]propane, hydroxypivalic acid neopentyl glycol diacrylate, 1,4-butanediol diacrylate, dicyclopentanyl diacrylate, dipentaerythritol hexaacrylate, dipenta-erythritol monohydroxypentaacrylate, ditrimethylolpropane tetraacrylate, pentaerythritol triacrylate, tetrabromo-bisphenol A diacrylate, triglycerol diacrylate, trimethylolpropane triacrylate, tris(acryloxyethyl) isocyanurate, ethylene glycol dimethacrylate, diethylene glycol dimethacrylate, triethylene glycol dimethacrylate, tetraethylene glycol dimethacrylate, polyethylene glycol dimethacrylate, propylene glycol dimethacrylate, polypropylene glycol dimethacrylate, 1,3-butylene glycol dimethacrylate, 1,4-butanediol dimethacrylate, 1,6-hexanediol dimethacrylate, neopentyl glycol dimethacrylate, 2-hydroxy-1,3-dimethacryloxypropane, 2,2-bis[4-(methacryloxy) phenyl]propane, 2,2-bis[4-(methacryloxy-ethoxy)phenyl]propane, 2,2-bis[4-(methacryloxyethoxy-diethoxy)phenyl]propane, 2,2-bis[4-(methacryloxyethoxypoly-ethoxy)phenyl]propane, tetrabromobisphenol A dimethacrylate, dicyclopentanyl dimethacrylate, dipentaerythritol hexamethacrylate, glycerol dimethacrylate, hydroxypivalic acid neopentyl glycol dimethacrylate, dipentaerythritol monohydroxypentamethacrylate, ditrimethylolpropane tetra-methacrylate, pentaerythritol trimethacrylate, penta-erythritol tetramethacrylate, triglycerol dimethacrylate, trimethylolpropane trimethacrylate, tris(methacryloxyethyl) isocyanurate, allyl methacrylate, divinylbenzene, diallyl phthalate, diallyl terephthalate, diallyl isophthalate and diethylene glycol bis-allylcarbonate. One of these monomers may be used alone, or two or more thereof may be used in combination.

As for other polymerization components, a compound represented by the following formula (1) may also be used.

Formula (1):

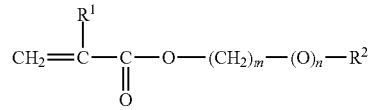

[wherein $R^1$ represents a hydrogen atom or a methyl group, $R^2$ represents a tert-butyl group, an alicyclic hydrocarbon group, an aromatic hydrocarbon group or a heterocyclic group, m represents an integer of 0 to 3, and n represents an integer of 0 or 1].

Examples of the alicyclic hydrocarbon group represented by $R^2$ in formula (1) include a cycloalkyl group, a cycloalkenyl group, an isobornyl group, a dicyclopentanyl group, a dicyclopentenyl group and an adamantane group, and examples of the heterocyclic group include a tetrahydro-furan group.

Specific examples of the compound represented by formula (1) are set forth below.

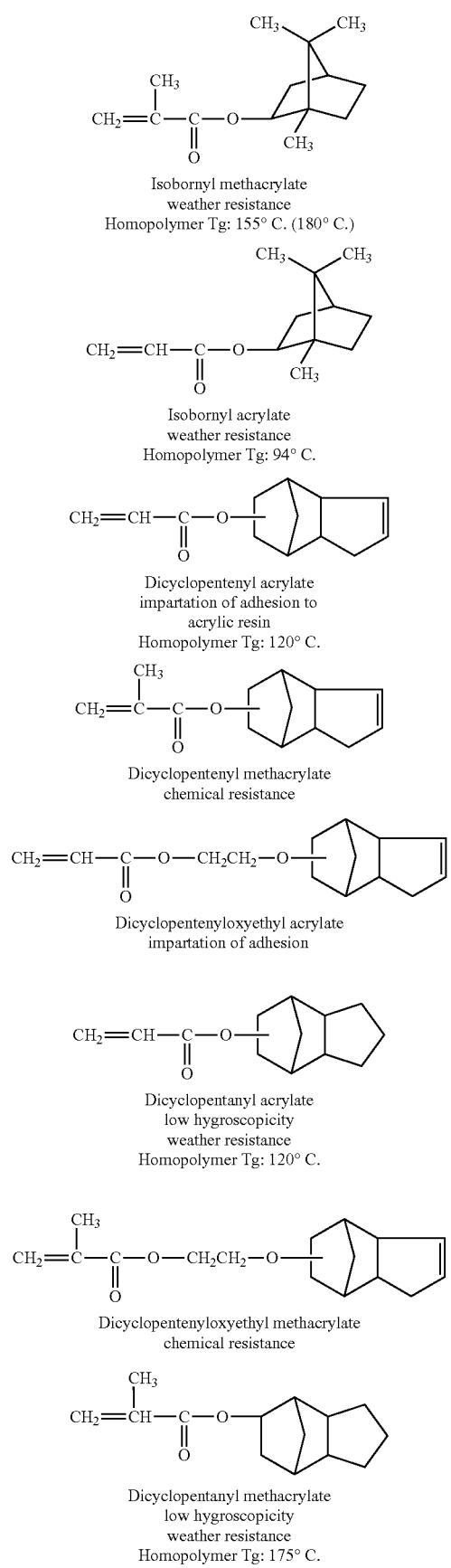

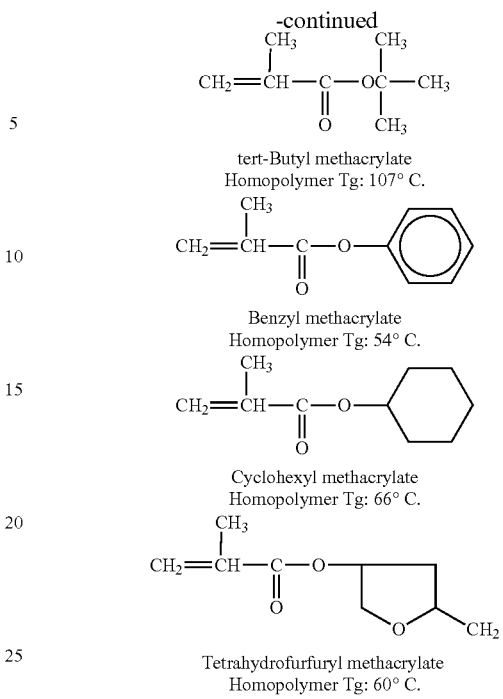

When the $R^2$ group which is a "bulky" group derived from the compound represented by formula (1) is incorporated into the polymer which is the main component of the wall material of the encapsulated product according to the present invention, the polymer less causes molecular deflection, that is, the molecular mobility decreases, and the mechanical strength or heat resistance of the polymer is thereby enhanced. Because of this, the ink composition containing the encapsulated product of this embodiment using a wall material comprising the polymer as the main component can provide a printed matter excellent in the scratch resistance and durability. Also, when the $R^2$ group which is a "bulky" group is caused to be present in the polymer constituting the wall material, the organic solvent in the ink composition can be prevented from penetrating inside the polymer and therefore, the encapsulated product can have excellent solvent resistance, whereby when an inkjet recording ink composition allowing the coexistence of a water-soluble organic solvent is produced, the dispersibility of color material particle, the storage stability of ink composition, and the ejection property of ink composition from inkjet head can be enhanced.

Incidentally, the polymer having the above-described "repeating structural unit derived from the crosslinking monomer" or the polymer having "a repeating structural unit derived from the compound represented by formula (1)" is advantageous in that the glass transition temperature (Tg) is high and the mechanical strength, heat resistance and solvent resistance are excellent.

However, in the encapsulated product using a wall material containing such a polymer, the plasticity of the polymer is insufficient and the encapsulated product when used as a component of an ink composition tends to hardly adhere to the recording medium, as a result, bad fixing to the recording medium or poor scratch resistance may be caused.

On the other hand, the polymer having a repeating structural unit derived from a monomer having a long-chain alkyl group out of the above-described hydrophobic monomers has flexibility. Accordingly, when the ratio of the "repeating structural unit derived from the crosslinking monomer" and/ or the "repeating structural unit derived from the compound (monomer) represented by formula (1)" to the "repeating structural unit derived from the monomer having a long-chain alkyl group" is appropriately adjusted, a wall material polymer ensuring high mechanical strength and excellent solvent resistance without impairing plasticity preferred as the wall material can be obtained. The ink composition containing an encapsulated product with the wall material containing such a polymer is excellent in the dispersion stability, long-term storage stability and ejection stability from the inkjet head, even if the ink composition contains a water-soluble organic solvent. Also, the encapsulated product of this embodiment has good fixing property to a recording medium such as paper or inkjet special media, and the ink composition containing the encapsulated product can provide a printed image excellent in the scratch resistance, durability and solvent resistance.

[Oil-Soluble Polymerization Initiator]

The oil-soluble polymerization initiator for use in the present invention is a polymerization initiator insoluble or sparingly soluble in water, and examples thereof include an oil-soluble azo compound-based initiator such as dimethyl-2,2'-azobis(2-methylpropionate), 2,2'-azobis (2,4-dimethylvaleronitrile) and 2,2'-azobis(2-methylbutyronitrile), and a peroxide such as benzoyl peroxide, dilauroyl peroxide, disuccinic acid peroxide, 1,1,3,3-tetramethylbutyl(peroxy-2-ethylhexanoate) and 2,5-dimethyl-2,5-di(2-ethylhexanoylperoxy)hexane. One of these initiators may be used, or two or more thereof may be used in combination. Among these, a peroxide has good solubility in the above-described hydrophobic monomer and is preferably used in the present invention.

According to the production method of an encapsulated product of the present invention, an ionic polymerizable surfactant having the opposite electric charge to the electric charge on the surface of the core substance adsorbs to the core substance surface having an electric charge, an oil-soluble polymerization initiator and a hydrophobic monomer are taken into a hydrophobic layer formed resulting from the hydrophobic group of the ionic polymerizable surfactant facing the hydrophobic group of another ionic polymerizable surfactant having the same or opposite electric charge to that of the former ionic polymerizable surfactant, and the hydrophobic monomer in the hydrophobic layer is converted into a polymer by the polymerization reaction while keeping the state of the latter ionic polymerizable surfactant being oriented toward the aqueous phase side. That is, a capsule is obtained in the state of the formed admicell maintaining its size, so that the particle diameter can be easily controlled and an encapsulated product having a uniform particle diameter (narrow particle size distribution) can be obtained.

[Other Constituent Components of Encapsulated Product]

As for the raw material constituting the encapsulated product, in addition to the components described above, for example, an ultraviolet absorbent, a light stabilizer, an antioxidant, a flame retardant, a plasticizer and a wax may be used.

[Particle Diameter, Etc. of Encapsulated Product]

The particle diameter and the like of the encapsulated product produced by the production method of the present invention (encapsulated product of the present invention) are described below.

The volume average particle diameter of the encapsulated product of the present invention may be appropriately adjusted according to the usage of the encapsulated product and is not particularly limited, but in the case of using the encapsulated product as a color material for an inkjet recording ink, the volume average particle diameter is preferably 300 nm or less, more preferably 150 nm or less, still more preferably from 50 to 120 nm. The volume average particle diameter of the encapsulated product can be controlled, for example, by the amount added of hydrophobic monomer, or the stirring state of reaction mixed solution.

The encapsulated product produced by the production method of the present invention tends has an aspect ratio (fineness ratio) of 0.9 to 1.3 and a Zingg index of 0.9 to 1.3 and readily takes a nearly spherical shape. Assuming that the short diameter of a certain particle is b, the long diameter is l and the thickness is t ($l \geqq b \geqq t > 0$), the aspect ratio (fineness ratio) is l/b ($\geqq 1$), the flatness is b/t ($\geqq 1$), and the Zingg index=fineness ratio/flatness is $(l \cdot t)/b^2$. In other words, the true sphere has an aspect ratio of 1 and a Zingg index of 1. If the Zingg index exceeds 1.3, the shape of the encapsulated product becomes flatter and the isotropy decreases.

Accordingly, the encapsulated product of the present invention exhibits excellent dispersibility and good dispersion stability when dispersed in water. Also, when the core substance of the encapsulated product of the present invention is a color material such as pigment or dye and the encapsulated product is used for an ink or the like, by virtue of excellent dispersibility and good dispersion stability, the printing density or color formation can be ensured with high efficiency. In Particular, when the encapsulated product is used for an inkjet recording ink, the flow property of the stable ink readily becomes Newtonian, excellent ejection stability is obtained and when the ink is landed on a recording medium such as paper, the encapsulated color material is disposed at a high density on the recording medium and the printing density or color formation can be ensured with high efficiency. Also, when the encapsulated product is used as the electrophotographic toner of a duplicator, a laser printer or the like, a high-quality image with sharp edges can be obtained and a high-resolution image can be responded.

Incidentally, in the production methods of an encapsulated product other than the present invention, such as acid precipitation method or phase inversion emulsification method, the encapsulated product can hardly have an aspect ratio and a Zingg index within the above-described ranges.

Also, the film-forming property of the encapsulated product of the present invention as well as the strength, chemical resistance, water resistance, light resistance, weather resistance, optical property and other physical or chemical properties of the wall material can be made suitable for the usage of the encapsulated product by appropriately controlling the composition, structure or the like of the polymer which is the main component of the wall material.

In particular, when the encapsulated product is used as the color material of an inkjet recording ink, the fixing property of the color material and the scratch resistance and gloss of the printed part can be controlled by the glass transition temperature (Tg) of the polymer (copolymer) which is the main component of the wall material.

In general, when the temperature of a polymer solid, particularly, an amorphous polymer solid, is elevated from a low temperature to a high temperature, there occurs a phenomenon that the state (vitreous state) where a very large force is required for slight deformation abruptly changes into a state where large deformation is caused with a small force. The temperature at which this phenomenon occurs is called a glass transition temperature (or a glass transition point). In a differential thermal curve obtained by measuring the temperature rise by means of a differential scanning calorimeter, the temperature at the intersection between a tangential line drawn from the bottom of a heat absorption peak to the initiation point of heat absorption and a base line is generally taken as the glass transition temperature (Tg in the present invention is in accordance with this definition). Furthermore, it is known that other physical properties such as elastic modulus, specific heat and refractive index also abruptly change at the glass transition temperature and the glass transition temperature can also be determined by measuring these physical properties. In addition, the glass transition temperature can be calculated according to the following Fox formula from the weight fraction of a monomer used for the synthesis of a copolymer and the glass transition temperature of a homopolymer obtained by homopolymerizing the monomer (in the present invention, the glass transition temperature obtained according to the Fox formula is used).

[Math. 1]

$$1/Tg_{[p]} = \sum_i (x_i / Tg_{[hp]i})$$ (Fox Formula)

(wherein $Tg_{[p]}$ is the glass transition temperature of the polymer obtained, i is the number affixed every different kinds of monomers, $Tg_{[hp]i}$ is the glass transition temperature of the homopolymer of the monomer i used for the polymerization, and xi is the weight fraction of the monomer i based on the total weight of the monomers polymerized).

In other words, when the temperature environment in which the encapsulated product is placed is higher than the glass transition temperature of the copolymer constituting the wall material of the encapsulated product, the copolymer enters into a state where large deformation is caused with a small force, and when the temperature further reaches the melting point, the copolymer melts. At this time, when another encapsulated product is present in the vicinity, the encapsulated products are fuse-bonded with each other to form a film. Even when the ambient temperature does not reach the melting point, in the case where the encapsulated products are put into contact with each other by a strong force and the conditions allowing the copolymer molecules covering respective encapsulated products to intertwine with each other are satisfied, the copolymers covering the encapsulated products are sometimes fuse-bonded with each other.

In the case of performing printing on a recording medium such as plain paper or special recording medium for inkjet recording by using an ink in which the encapsulated product is used as a color material, in order to achieve more successful film formation of the encapsulated product at room temperature and obtain good results in terms of fixing of the color material and scratch resistance or gloss of the printed part, Tg of the polymer as the main component of the wall material is preferably 30° C. or less, more preferably 15° C. or less, still more preferably 10° C. or less. Accordingly, in the case of using the encapsulated product for an inkjet recording ink, the polymer (copolymer) constituting the wall material is preferably designed to have a glass transition temperature of 30° C. or less, more preferably 15° C. or less, still more preferably 10° C. or less. However, if the glass transition temperature is less than −20° C., the solvent resistance tends to decrease and therefore, careful design is demanded.

In the case where the encapsulated product using a color material for the core substance is used as a toner, the glass transition temperature (Tg) of the copolymer covering the color material particle which is the core substance of the encapsulated particle is set to be not higher than the fixing temperature, whereby the copolymers covering the color material particles can be fuse-bonded to form a film on plain paper which is a recording medium, in the state of the color material being embraced (included) inside the film and fixing of the colorant on the recording medium and scratch resistance can be achieved. In this case, the glass transition temperature of the copolymer covering the color material particle of the encapsulated product of the present invention is preferably not lower than the temperature having no effect on the electro-photographic process except for fixing process, particularly, on the development process, transfer process and the like. As for the hydrophobic monomer, a monomer satisfying the properties required as the physical toner properties such as film-forming property, coat strength, electrical property, chemical resistance, water resistance, light fastness, weather resistance and optical property, is appropriately selected, and the amount added thereof is arbitrarily determined.

[Ink Composition]

As regards the encapsulated product obtained by the production method of the present invention (encapsulated product of the present invention), the encapsulated color material obtained when using a color material (particle) as the core substance can be used for an ink composition and is preferred as a color material particularly for use in an inkjet recording ink. Among such encapsulated color materials, an encapsulated color material with a pigment being the color material particle as the core substance (encapsulated pigment) is preferred. The ink composition for inkjet recording of the present invention using the encapsulated pigment is described below.

[Ink Composition for Inkjet Recording]

The ink composition for inkjet recording of the present invention is an aqueous ink composition where the above-described encapsulated pigment is contained in the dispersed state in an aqueous medium. The encapsulated pigment content in the ink composition is preferably from 1 to 20 wt %, more preferably from 3 to 15 wt %, based on the entire weight of the ink composition. For obtaining high printing density and high color formation, this content is still more preferably from 5 to 15 wt %.

The solvent used in the ink composition for inkjet recording of the present invention preferably comprises water and a water-soluble organic solvent and may contain other components, if desired.

Also, in order to impart water retentivity and wettability to the ink composition, a wetting agent comprising a high boiling point water-soluble organic solvent is preferably added to the ink composition for inkjet recording of the present invention. The high boiling point water-soluble organic solvent is preferably a water-soluble organic solvent having a boiling point of 180° C. or more.

Specific examples of the water-soluble organic solvent having a boiling point of 180° C. or more, which can be used in the present invention, include ethylene glycol, propylene glycol, diethylene glycol, pentamethylene glycol, trimethylene glycol, 2-butene-1,4-diol, 2-ethyl-1,3-hexanediol, 2-methyl-2,4-pentanediol, tripropylene glycol, polyethylene glycol having a molecular weight of 2,000 or less, 1,3-propylene glycol, isopropylene glycol, isobutylene glycol, glycerin, mesoerythritol and pentaerythritol. The boiling point of the high boiling point water-soluble organic solvent for use in the present invention is more preferably 200° C. or more. In the ink composition for inkjet recording of the present invention, one of these organic solvents may be used alone, or two or more thereof may be used. By virtue of adding a high boiling point water-soluble organic solvent to the ink composition, an ink for inkjet recording capable of maintaining flowability and re-dispersibility for a long period of time even when allowed to stand in an open state (a state of the ink composition being in contact with air at room temperature), can be obtained. Furthermore, such an ink composition scarcely causes clogging of an inkjet nozzle during printing in an inkjet printer or at the restarting after interruption of printing, so that an ink composition assured of high ejection stability from an inkjet nozzle can be obtained.

The total content of water-soluble organic solvents including the high boiling point water-soluble organic solvent is preferably on the order of 10 to 50 wt %, more preferably from 10 to 30 wt %, based on the entire weight of the ink composition.

The ink composition for inkjet recording of the present invention may further contain one or more polar solvents selected from the group consisting of 2-pyrrolidone, N-methylpyrrolidone, $\epsilon$-caprolactam, dimethyl sulfoxide, sulfolane, morpholine, N-ethylmorpholine and 1,3-dimethyl-2-imidazolidinone. The addition of a polar solvent provides an effect that the dispersibility of the encapsulated pigment particle in the ink composition is enhanced, and good ejection stability of the ink can be achieved.

The content of such a polar solvent is preferably from 0.1 to 20 wt %, more preferably from 1 to 10 wt %, based on the entire weight of the ink composition.

For the purpose of accelerating the penetration of the aqueous solvent into the recording medium, the ink composition for inkjet recording of the present invention preferably further contains a penetrant. By virtue of prompt penetration of the aqueous solvent into the recording medium, a recorded matter with less image blurring can be obtained. As for such a penetrant, an alkyl ether of polyhydric alcohol (also called glycol ethers) and/or a 1,2-alkyldiol are preferably used. Examples of the alkyl ether of polyhydric alcohol include ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, ethylene glycol mono-n-propyl ether, ethylene glycol mono-iso-propyl ether, diethylene glycol mono-iso-propyl ether, ethylene glycol mono-n-butyl ether, diethylene glycol mono-n-butyl ether, triethylene glycol mono-n-butyl ether, ethylene glycol mono-tert-butyl ether, diethylene glycol mono-tert-butyl ether, 1-methyl-1-methoxybutanol, propylene glycol monomethyl ether, propylene glycol monoethyl ether, propylene glycol mono-tert-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, dipropylene glycol mono-iso-propyl ether, propylene glycol mono-n-butyl ether and dipropylene glycol mono-n-butyl ether. Examples of the 1,2-alkyldiol include 1,2-pentanediol and 1,2-hexanediol. Other examples include diols of linear hydrocarbon, such as 1,3-propanediol, 1,4-butanediol, 1,5-pentanediol, 1,6-hexanediol, 1,7-heptane-diol and 1,8-octanediol. An appropriate penetrant may be selected from these and used in the ink composition for inkjet recording of the present invention.

In a preferred embodiment of the present invention, at least one member selected from propylene glycol monobutyl ether, dipropylene glycol monobutyl ether, diethylene glycol monobutyl ether, triethylene glycol monobutyl ether, 1,2-pentanediol and 1,2-hexanediol is used as the penetrant.

The penetrant content is, in terms of the total amount, preferably from 1 to 20 wt %, more preferably from 1 to 10 wt %, based on the entire weight of the ink composition. When the penetrant content is 1 wt % or more, an effect of enhancing the penetration of the ink composition into the recording medium is obtained, and when the content is 20 wt % or less, generation of blurring on the image printed using this ink composition can be prevented and excessive increase in the viscosity of the ink composition can be suppressed. In particular, when a 1,2-alkyldiol such as 1,2-pentanediol and 1,2-hexanediol is used in the ink composition, good drying property of the ink composition after printing can be obtained and blurring of the image can be reduced.

Also, when glycerin is incorporated into the ink composition for inkjet recording of the present invention, clogging of an inkjet nozzle on using the ink composition for inkjet recording is less generated, and the storage stability of the ink composition itself can also be enhanced.

Furthermore, in the case of using glycol ethers in the ink composition for inkjet recording of the present invention, an acetylene glycol-based surfactant described later is preferably used in combination with the glycol ethers.

The ink composition for inkjet recording of the present invention preferably contains a surfactant, particularly an anionic surfactant and/or a nonionic surfactant. Specific examples of the anionic surfactant include an alkanesulfonate, an $\alpha$-olefinsulfonate, an alkylbenzenesulfonate, an alkylnaphthalenesulfonic acid, an acylmethyltaurine acid, a dialkylsulfosuccinic acid, an alkylsulfuric ester salt, a sulfated oil, a sulfated olefin, a polyoxyethylene alkyl ether sulfuric ester salt, a fatty acid salt, an alkyl sarcosine salt, an alkylphosphoric ester salt, a polyoxyethylene alkyl ether phosphoric ester salt and a monoglyceride phosphoric ester salt. Specific examples of the nonionic surfactant include a polyoxy-ethylene alkyl ether, a polyoxyethylene alkyl phenyl ether, a polyoxyethylene alkyl ester, a polyoxyethylene alkylamide, a glycerin alkyl ester, a sorbitan alkyl ester, a sugar alkyl ester, a polyhydric alcohol alkyl ether, and an alkanolamine fatty acid amide.

More specifically, examples of the anionic surfactant include sodium dodecylbenzenesulfonate, sodium laurate and ammonium salt of polyoxyethylene alkyl ether sulfate, and examples of the nonionic surfactant include an ether-based compound such as polyoxyethylene nonylphenyl ether, polyoxyethylene octylphenyl ether, polyoxyethylene dodecyl-phenyl ether, polyoxyethylene alkylallyl ether, polyoxyethylene oleyl ether, polyoxyethylene lauryl ether, polyoxyethylene alkyl ether and polyoxyalkylene alkyl ether, and an ester-based compound such as polyoxyethylene oleic acid, polyoxyethylene oleic acid ester, polyoxyethylene distearic acid ester, sorbitan laurate, sorbitan monostearate, sorbitan monooleate, sorbitan sesquioleate, polyoxyethylene monooleate and polyoxyethylene stearate.

Particularly, the ink composition for inkjet recording in a preferred embodiment of the present invention contains, as the surfactant, an acetylene glycol-based surfactant and/or an acetylene alcohol-based surfactant. By virtue of containing such a surfactant, the aqueous solvent contained in the ink composition can readily penetrate into the recording medium and therefore, an image with less blurring can be printed on various recording mediums. A commercial product available on the market as an acetylene glycol-based surfactant can also be used, and specific examples thereof include Surfynol 104, 82, 465, 485, 104PG50 and TG (all trade names, available from Air Products and Chemicals, Inc.); and Olfine STG and Olfine E1010 (both trade names, produced by Nissin Chemical Industry Co., Ltd.). Examples of the commercial product as the acetylene alcohol-based surfactant include Surfynol 61 (trade name, available from Air Products and Chemicals, Inc.).

Such an acetylene glycol-based surfactant and/or acetylene alcohol-based surfactant is preferably used to account for 0.01 to 10 wt %, more preferably from 0.1 to 5 wt %, based on the entire weight of the ink composition.

In the encapsulated pigment (the encapsulated product where the core substance is a pigment) of the present invention, when the pigment particle is coated with a capsule wall material mainly comprising a polymer having a crosslinked structure derived from the crosslinking monomer, a polymer having a repeating structural unit derived from the monomer represented by formula (1), or a polymer having both in its structure, as described above, the encapsulated pigment has high mechanical strength, heat resistance and solvent resistance, but due to insufficient plasticity of the polymer, fixing property of the color material on the recording medium or scratch resistance tends to decrease. However, the fixing property or scratch resistance can be compensated for by using the polymer in combination with a fine polymer particle having the above-described properties.

The fine polymer particle for use in the ink composition for inkjet recording of the present invention preferably has, on the surface thereof, an ionic group of the same species as the ionic group on the surface of the encapsulated pigment of the present invention and has a glass transition temperature of 30° C. or less and a volume average particle diameter of 10 to 100 nm. This fine polymer particle has a film-forming property and when printing on a recording medium such as plain paper or special media for inkjet recording is performed using the ink composition for inkjet recording of the present invention containing the fine polymer particle, the solvent component (including water) in the ink composition penetrates into the recording medium and the fine polymer particle and the encapsulated pigment particle come close to each other, as a result, the fine polymer particle forms a polymer film to embrace the encapsulated pigment particle. By virtue of such a polymer film, the encapsulated pigment in the ink can be more firmly fixed on the recording medium surface, so that an image having very excellent resistance against scratches and water can be formed.

In order to impart good film-forming property to the fine polymer particle, as described above, the glass transition temperature of the polymer is preferably 30° C. or less, more preferably 15° C. or less, still more preferably 10° C. or less. The glass transition temperature of the polymer can be adjusted by appropriately selecting the kind or compositional ratio of the monomers used. In the present invention, a glass transition temperature obtained by measuring the temperature rise by means of a differential scanning calorimeter (DSC) is used as the glass transition temperature of the polymer.

This fine polymer particle does not cause aggregation even when present together with the encapsulated pigment particle of the present invention in the ink composition, and a good dispersed state is obtained.

Furthermore, when the particle diameter of the fine polymer particle is from 10 to 100 nm in terms of the volume average particle diameter, an image having good gloss and high clarity is obtained.

The fine polymer particle for use in the ink composition for inkjet recording of the present invention can be produced by a known emulsion polymerization method. For example, an unsaturated vinyl monomer is emulsion-polymerized in water in the presence of a polymerization initiator and an emulsifier, whereby the fine polymer particle can be obtained. As for the unsaturated vinyl monomer, the same as those described above for the hydrophobic monomer can be used. Also, as for the unsaturated vinyl monomer having an ionic group, the same as those described above for the ionic monomer can be used. The polymerization initiator, emulsifier, surfactant, molecular-adjusting agent, neutralizer and the like used at the production of the fine polymer particle are used according to a known method. In particular, when the above-described anionic polymerizable surfactant is used as the emulsifier, the anionic polymerizable surfactant and the monomer are copolymerized and therefore, the amount of the emulsifier in the liquid becomes small to give rise to less bubbling in the liquid, as a result, the ejection stability of the ink composition is more enhanced. Also, when the same anionic polymerizable surfactant as that used for the encapsulated pigment of the present invention is employed, the dispersion stability and storage stability become remarkably excellent.

In the case of using the above-described fine polymer particle in the ink composition for inkjet recording of the present invention, the fine polymer particle may be used as a fine particle power, but a polymer emulsion prepared by dispersing the fine polymer particle in a water medium is preferably mixed with other components contained in the ink composition. The amount of the fine polymer particle contained in the ink composition is preferably on the order of 0.01 to 10 wt %, more preferably on the order of 0.01 to 5 wt %, based on the entire weight of the ink composition.

The ink composition for inkjet recording of the present invention may contain a pH adjusting agent. In the case where the pigment particle as the core substance or the above-described fine polymer particle has an anionic group on the surface, the ink composition is preferably adjusted to a pH of 7 to 11, more preferably from 8 to 9, and a basic compound is preferably used as the pH adjusting agent. Also, in the case where the pigment particle or fine polymer particle has a cationic group on the surface, the ink composition is preferably adjusted to a pH of 5 to 7, more preferably from 6 to 7, and an acidic compound is preferably used as the pH adjusting agent. Specific examples of the basic compound preferred as the pH adjusting agent include alkali metal salts such as sodium hydroxide, potassium hydroxide, lithium hydroxide, sodium carbonate, sodium hydrogencarbonate, potassium carbonate, lithium carbonate, sodium phosphate, potassium phosphate, lithium phosphate, potassium dihydrogenphosphate, dipotassium hydrogenphosphate, sodium oxalate, potassium oxalate, lithium oxalate, sodium borate, sodium tetraborate, potassium hydrogenphthalate and potassium hydrogentartrate; ammonia; and amines such as methylamine, ethylamine, diethylamine, trimethylamine, triethylamine, tris(hydroxy-methyl)aminomethane hydrochloride, triethanolamine, diethanolamine, diethylethanolamine, triisopropenolamine, butyldiethanolamine, morpholine and propanolamine.

Among these, when an alkali hydroxide compound or an amine alcohol is added to the ink composition, the dispersion stability of the anionic group-containing pigment particle in the ink can be enhanced.

Also, for the purpose of preventing fungus, putrefaction or rust, one or more compounds selected from benzoic acid, dichlorophene, hexachlorophene, sorbic acid, p-hydroxybenzoic acid ester, ethylenediaminetetraacetic acid (EDTA), sodium dehydroacetate, 1,2-benthiazolin-3-one [product name: Proxel XL (produced by Avecia)], 3,4- isothiazolin-3-one and 4,4-dimethyloxazolidine may be added to the ink composition for inkjet recording of the present invention.

Furthermore, for the purpose of preventing nozzles of the inkjet recording head from being dried, at least one member selected from the group consisting of urea, thiourea, ethylene urea and the like may also be added to the ink composition for inkjet recording of the present invention.

EXAMPLES

The present invention will be illustrated in greater detail with reference to the following Examples and Comparative Examples, but the invention should not be construed as being limited thereto.

(Production of Dispersion of Magenta Pigment P1 Having Anionic Group on the Surface)

An isoindolinone pigment (C.I. Pigment Red 122) (20 g) and 500 g of quinoline were mixed and dispersed for 2 hours by Eiger Motor Mill M250 (manufactured by Eiger Japan Co., Ltd.) under the conditions of a bead loading of 70% and a rotation number of 5,000 rpm, a mixed solution of the dispersed pigment paste and a solvent was transferred to an evaporator and heated at 120° C. while reducing the pressure to 30 mmHg or less, thereby distilling off the water contained in the system as much as possible, and then the temperature was controlled to 160° C. Subsequently, 20 g of a sulfonated pyridine complex was added and reacted for 8 hours and after the completion of reaction, the reaction solution was washed several times with excess quinoline, poured into water and then filtered, whereby a dispersion of Magenta Pigment P1 having an anionic group (sulfonic acid group) on the surface was obtained. The solid content concentration of the obtained dispersion was 15.0%. The sulfur content in the obtained pigment dispersion was determined by a flask combustion method and found to be 0.36%, and the amount of the anionic group (sulfonic acid group) introduced into the pigment surface was determined from the sulfur content above and found to be $1.16 \times 10^{-4}$ mol/g (molar number of the anionic polymerizable surfactant per g of the pigment).

(Production of Dispersion of Cyan Pigment P2 Having Adsorbed to the Surface Thereof Anionic Polymerizable Surfactant)

A copper phthalocyanine pigment (C.I. Pigment Blue 15:1) (20 g) was mixed with 10 g of an anionic polymerizable surfactant AQUALON KH-10 (produced by Dai-ichi Kogyo Seiyaku Co., Ltd.) and ion-exchanged water and dispersed for 2 hours by Eiger Motor Mill M250 (manufactured by Eiger Japan Co., Ltd.) under the conditions of a bead loading of 70% and a rotation number of 5,000 rpm, and the non-adsorbed anionic polymerizable surfactant KH-10 was removed by ultrafiltration. The change in the absorption spectrum of the passed solution was traced by a spectrophotometer and the washing by ultrafiltration was terminated when the absorption spectrum became constant. In this way, the objective dispersion of Cyan Pigment P2 having adsorbed to the surface thereof an anionic polymerizable surfactant KH-10 was obtained. The solid content concentration of the obtained dispersion was 11.0%. Also, the content of the anionic polymerizable surfactant KH-10 in the dispersion was determined by thermogravimetric analysis and found to be 22.3% based on the pigment. The sulfur content determined by a flask combustion method was 0.64%, and the amount of the anionic polymerizable surfactant KH-10 in the liquid solution determined from the sulfur content above (regarded as the amount of the anionic polymerizable surfactant adsorbed to the pigment) was $2.0 \times 10^{-4}$ mol/g (molar number of the anionic polymerizable surfactant per g of the pigment).

(Production of Encapsulated Product Dispersions M1 to M3, H1 and H2)

Using the thus-produced Magenta Pigment P1 and Cyan Pigment P2 as the core substance, Encapsulated Product Dispersions M1 to M3, H1 and H2 were produced as follows. The production of Encapsulated Product Dispersions M1 to M3 is Example of the present invention, and the production of Encapsulated Product Dispersions H1 and H2 is Comparative Example.

<Production of Encapsulated Product Dispersion M1>

To 100 g of the Magenta Pigment P1 dispersion, 1.75 g (effective ingredient: 0.63 g) of a cationic polymerizable surfactant DAMLAC-2 (diallylmethyldodecylammonium bromide, produced by Toho Chemical Industrial Co., Ltd.) was added and mixed with stirring for 30 minutes. After irradiating an ultrasonic wave for 30 minutes, 2.34 g of an anionic polymerizable surfactant SR-10 (produced by Asahi Denka Co., Ltd.) dissolved in 100 ml of ion-exchanged water was added to the mixture obtained above and mixed with stirring for 1 hour. Furthermore, a mixture obtained by mixing 18.8 g of benzyl methacrylate, 8.0 g of isobornyl methacrylate, 8.0 g of lauryl methacrylate and 0.45 g of benzoyl peroxide as the oil-soluble polymerization initiator was added and mixed with stirring for 10 minutes, and 500 ml of ion-exchanged water was then added and mixed with stirring for 1 hour. The resulting mixture was charged into a reaction vessel equipped with a reflux tube, a nitrogen inlet tube, a dropping tube, a stirring device and a temperature regulator, the temperature was elevated to 80° C. over 40 minutes while flowing nitrogen and after allowing the reaction to proceed for 5 hours, the reaction was stopped by lowering the temperature.

After the completion of polymerization, the pH was adjusted to 8 with an aqueous 1 mol/liter potassium hydroxide solution and coarse particles were removed by a prefilter. The residue was ultrafiltered by a cross-flow process in an ultrafiltration apparatus to obtain the objective Encapsulated Product Dispersion M1.

<Production of Encapsulated Product Dispersion M2>

To 90.3 g of the Cyan Pigment P2 dispersion, 2.03 g (effective ingredient: 0.72 g) of a cationic polymerizable surfactant DAMLAC-2 (diallylmethyldodecylammonium bromide, produced by Toho Chemical Industrial Co., Ltd.) was added and mixed with stirring for 30 minutes. After irradiating an ultrasonic wave for 30 minutes, 2.68 g of an anionic polymerizable surfactant SR-10 (produced by Asahi Denka Co., Ltd.) dissolved in 100 ml of ion-exchanged water was added to the mixture obtained above and mixed with stirring for 1 hour. Furthermore, a mixture obtained by mixing 10.6 g of benzyl methacrylate, 4.5 g of isobornyl methacrylate, 4.5 g of lauryl methacrylate and 0.49 g of benzoyl peroxide as the oil-soluble polymerization initiator was added and mixed with stirring for 10 minutes, and 300 ml of ion-exchanged water was then added and mixed with stirring for 1 hour. The resulting mixture was charged into a reaction vessel equipped with a reflux tube, a nitrogen inlet tube, a dropping tube, a stirring device and a temperature regulator, the temperature was elevated to 80° C. over 40 minutes while flowing nitrogen and after allowing the reaction to proceed for 5 hours, the reaction was stopped by lowering the temperature.

After the completion of polymerization, the pH was adjusted to 8 with an aqueous 1 mol/liter potassium hydroxide solution and coarse particles were removed by a prefilter. The residue was ultrafiltered by a cross-flow process in an ultrafiltration apparatus to obtain the objective Encapsulated Product Dispersion M2.

<Production of Encapsulated Product Dispersion M3>

To 90.3 g of the Magenta Pigment P2 dispersion, 2.03 g (effective ingredient: 0.72 g) of a cationic polymerizable surfactant DAMLAC-2 (diallylmethyldodecyl-ammonium bromide, produced by Toho Chemical Industrial Co., Ltd.) was added and mixed with stirring for 30 minutes. After irradiating an ultrasonic wave for 30 minutes, 2.68 g of an anionic polymerizable surfactant SR-10 (produced by Asahi Denka Co., Ltd.) dissolved in 100 ml of ion-exchanged water was added to the mixture obtained above and mixed with stirring for 1 hour. Furthermore, a mixture obtained by mixing 10.6 g of benzyl methacrylate, 4.5 g of isobornyl methacrylate, 4.5 g of lauryl methacrylate, 0.2 g of 1,6-hexanediol dimethacrylate and 0.49 g of benzoyl peroxide as the oil-soluble polymerization initiator was added and mixed with stirring for 10 minutes, and 300 ml of ion-exchanged water was then added and mixed with stirring for 1 hour. The resulting mixture was charged into a reaction vessel equipped with a reflux tube, a nitrogen inlet tube, a dropping tube, a stirring device and a temperature regulator, the temperature was elevated to 80° C. over 40 minutes while flowing nitrogen and after allowing the reaction to proceed for 5 hours, the reaction was stopped by lowering the temperature.

After the completion of polymerization, the pH was adjusted to 8 with an aqueous 1 mol/liter potassium hydroxide solution and coarse particles were removed by a prefilter. The residue was ultrafiltered by a cross-flow process in an ultrafiltration apparatus to obtain the objective Encapsulated Product Dispersion M3.

<Production of Encapsulated Product Dispersion H1>

To 100 g of the Magenta Pigment P1 dispersion, 1.75 g (effective ingredient: 0.63 g) of a cationic polymerizable surfactant DAMLAC-2 (diallylmethyldodecylammonium bromide, produced by Toho Chemical Industrial Co., Ltd.) was added and mixed with stirring for 30 minutes. After irradiating an ultrasonic wave for 30 minutes, 2.34 g of an anionic polymerizable surfactant SR-10 (produced by Asahi Denka Co., Ltd.) dissolved in 100 ml of ion-exchanged water was added to the mixture obtained above and mixed with stirring for 1 hour. Furthermore, a monomer mixture obtained by mixing 18.8 g of benzyl methacrylate, 8.0 g of isobornyl methacrylate and 8.0 g of lauryl methacrylate was added and mixed with stirring for 10 minutes, and 500 ml of ion-exchanged water was then added and mixed with stirring for 1 hour. The resulting mixture was charged into a reaction vessel equipped with a reflux tube, a nitrogen inlet tube, a dropping tube, a stirring device and a temperature regulator, the temperature was elevated to 80° C. over 40 minutes while flowing nitrogen, an aqueous potassium persulfate solution obtained by dissolving 0.45 g of potassium persulfate as the water-soluble polymerization initiator in 100 ml of ion-exchanged water was gradually added dropwise and after allowing the reaction to proceed for 5 hours, the reaction was stopped by lowering the temperature. After the completion of polymerization, the pH was adjusted to 8 with an aqueous 1 mol/liter potassium hydroxide solution and coarse particles were removed by a prefilter. The residue was ultrafiltered by a cross-flow process in an ultrafiltration apparatus to obtain the objective Encapsulated Product Dispersion H1.

<Production of Encapsulated Product Dispersion H2>

To 90.3 g of the Cyan Pigment P2 dispersion, 2.03 g (effective ingredient: 0.72 g) of a cationic polymerizable surfactant DAMLAC-2 (diallylmethyldodecylammonium bromide, produced by Toho Chemical Industrial Co., Ltd.) was added and mixed with stirring for 30 minutes. After irradiating an ultrasonic wave for 30 minutes, 2.68 g of an anionic polymerizable surfactant SR-10 (produced by Asahi Denka Co., Ltd.) dissolved in 100 ml of ion-exchanged water was added to the mixture obtained above and mixed with stirring for 1 hour. Furthermore, a monomer mixture obtained by mixing 10.6 g of benzyl methacrylate, 4.5 g of isobornyl methacrylate and 4.5 g of lauryl methacrylate was added and mixed with stirring for 10 minutes, and 300 ml of ion-exchanged water was then added and mixed with stirring for 1 hour. The resulting mixture was charged into a reaction vessel equipped with a reflux tube, a nitrogen inlet tube, a dropping tube, a stirring device and a temperature regulator, the temperature was elevated to 80° C. over 40 minutes while flowing nitrogen, an aqueous potassium persulfate solution obtained by dissolving 0.49 g of potassium persulfate as the water-soluble polymerization initiator in 100 ml of ion-exchanged water was gradually added dropwise and after allowing the reaction to proceed for 5 hours, the reaction was stopped by lowering the temperature.

After the completion of polymerization, the pH was adjusted to 8 with an aqueous 1 mol/liter potassium hydroxide solution and coarse particles were removed by a prefilter. The residue was ultrafiltered by a cross-flow process in an ultrafiltration apparatus to obtain the objective Encapsulated Product Dispersion H2.

Evaluation

Figure 6A:
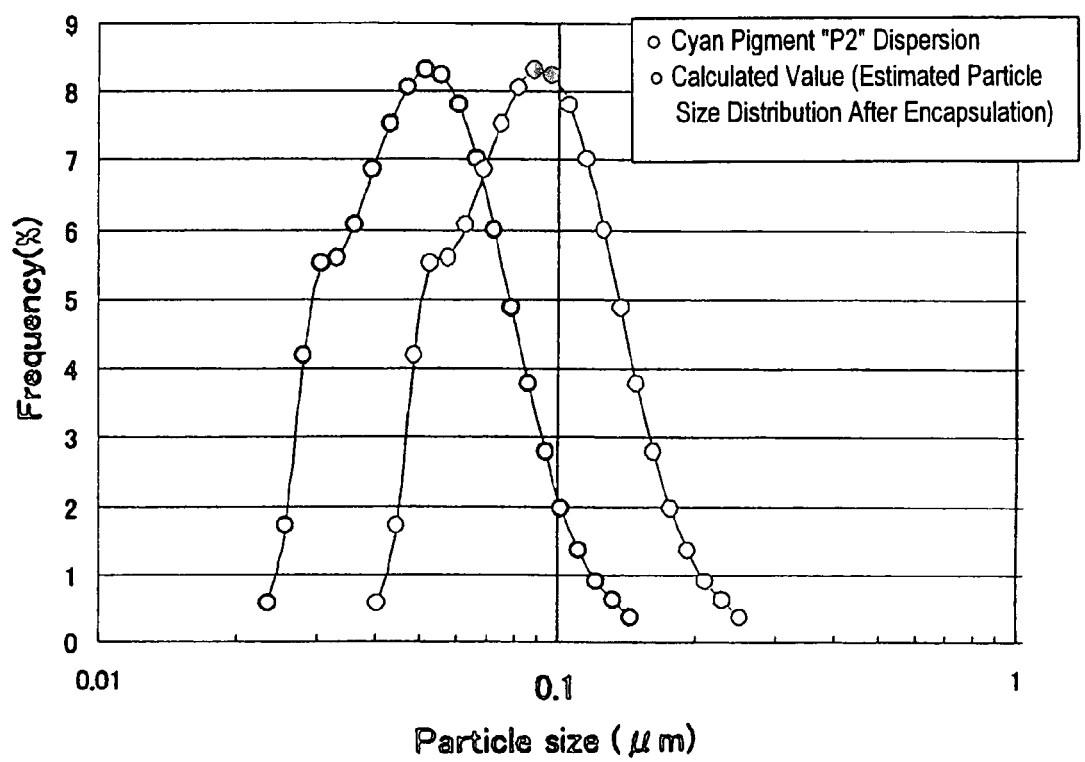
FIGS. 6(*a*) to 6(*c*) each is a graph showing a particle size distribution (volume distribution)

The volume average particle diameter and particle size distribution (volume distribution) of the encapsulated product in the encapsulated product dispersion obtained above were measured using a laser Doppler system particle size distribution analyzer Microtrac UPA150 manufactured by Leads & Northlop Co. The measurement results of the volume average particle diameter are shown in Table 1 below, and the measurement results of the particle size distribution (volume distribution) (measurement results for the Cyan Pigment P2 dispersion and Encapsulated Product Dispersions. M2 and H2) are shown in FIG. 6.

TABLE 1

| | Encapsulated Product Dispersion | Core Substance (Pigment) | Volume Average Particle Diameter |
|---|---|---|---|
| Example 1 | M1 | P1*[1] | 210 nm |
| Example 2 | M2 | P2*[2] | 108 nm |
| Example 3 | M3 | P2*[2] | 105 nm |
| Comparative Example 1 | H1 | P1*[1] | 400 nm |
| Comparative Example 2 | H2 | P2*[2] | 250 nm |

*[1]The volume average particle diameter of Magenta Pigment P1 is 120 nm.
*[2]The volume average particle diameter of Cyan Pigment P2 is 53 nm.

As apparent from comparison between FIG. 6(*b*) and FIG. 6(*c*), as compared with the encapsulated product (Dispersion H2) of Comparative Example 2 obtained using a water-soluble polymerization initiator, the encapsulated product (Dispersion M2) of Example 2 obtained using an oil-soluble polymerization initiator as the polymerization initiator has a particle size distribution close to the calculated value (estimated particle size distribution) shown in FIG. 6(*a*) and this particle size distribution has a uniform shape and is narrow.

While the invention has been described in detail and with reference to specific embodiments thereof, it will be apparent to one skilled in the art that various changes and modifications can be made therein without departing from the spirit and scope thereof.

This application is based on Japanese Patent Application No. 2006-120279 filed Apr. 25, 2006, and the contents thereof are herein incorporated by reference.

What is claimed is:

1. A method for producing an encapsulated product in which a core substance having an electric charge on its surface is coated with a wall material comprising a polymer as a main component, the production method comprising at least the following steps (1) to (4):

(1) a step of adding an ionic polymerizable surfactant A containing an ionic group having the opposite electric charge to the electric charge on the surface of said core substance, a hydrophobic group and a polymerizable group to an aqueous solvent containing said core substance, followed by mixing, thereby adsorbing said ionic polymerizable surfactant A to the surface of said core substance;

(2) a step of adding, after said step (1), an ionic polymerizable surfactant B containing an ionic group having the same or opposite electric charge to the electric charge on the surface of said core substance, a hydrophobic group and a polymerizable group, followed by mixing;

(3) a step of adding, after said step (2), a hydrophobic monomer and an oil-soluble polymerization initiator, followed by mixing; and (4) a step of polymerizing said ionic polymerizable surfactant A, said ionic polymerizable surfactant B and said hydrophobic monomer to form the polymer.

2. The production method of an encapsulated product as claimed in claim 1, wherein said oil-soluble polymerization initiator is one or more members selected from the group consisting of azo polymerization initiators and organic peroxide polymerization initiators.

3. The production method of an encapsulated product as claimed in claim 1, wherein in said step (1), after adding said components to said aqueous solvent and mixing, an ultrasonic wave is irradiated on said aqueous solvent.

4. The production method of an encapsulated product as claimed in claim 1, wherein in said step (2), a nonionic polymerizable surfactant C containing a nonionic group, a hydrophobic group and a polymerizable group is added and mixed together with said ionic polymerizable surfactant B.

5. The method as claimed in claim 1, wherein in step (3) the oil-soluble polymerization initiator is dissolved in the hydrophobic monomer to obtain a monomer solution and the monomer solution so obtained is mixed with the dispersion obtained in step (2).

6. The method as claimed in claim 1, wherein the core substance comprises pigment particles, and the steps (1)-(4) result in an encapsulated product dispersion comprising encapsulated particles having a uniform particle size distribution.

7. The method as claimed in claim 6, wherein the volume average particle diameter of the encapsulated particles is not more than about two times greater than the volume average particle diameter of the pigment particles.

8. The production method of an encapsulated product as claimed in claim 2, wherein in said step (1), after adding said components to said aqueous solvent and mixing, an ultrasonic wave is irradiated on said aqueous solvent.

9. The production method of an encapsulated product as claimed in claim 2, wherein in said step (2), a nonionic polymerizable surfactant C containing a nonionic group, a hydrophobic group and a polymerizable group is added and mixed together with said ionic polymerizable surfactant B.

10. The method as claimed in claim 2, wherein in step (3) the oil-soluble polymerization initiator is dissolved in the hydrophobic monomer to obtain a monomer solution and the monomer solution so obtained is mixed with the dispersion obtained in step (2).

11. The method as claimed in claim 2, wherein the core substance comprises pigment particles, and the steps (1)-(4) result in an encapsulated product dispersion comprising encapsulated particles having a uniform particle size distribution.

12. The method as claimed in claim 11, wherein the volume average particle diameter of the encapsulated particles is not more than about two times greater than the volume average particle diameter of the pigment particles.

* * * * *